INVENTOR.
JOHN V. BOUYOUCOS

BY Martin L. Kacher
ATTORNEY

March 5, 1968 J. V. BOUYOUCOS 3,371,726

ACOUSTIC APPARATUS

Filed May 24, 1965 11 Sheets-Sheet 2

INVENTOR.
JOHN V. BOUYOUCOS

BY

ATTORNEY

INVENTOR.
JOHN V. BOUYOUCOS

BY

ATTORNEY

INVENTOR.
JOHN V. BOUYOUCOS
BY
Martin L. Kacher
ATTORNEY

March 5, 1968 J. V. BOUYOUCOS 3,371,726

ACOUSTIC APPARATUS

Filed May 24, 1965 11 Sheets-Sheet 5

INVENTOR.
JOHN V. BOUYOUCOS

BY Martin L. Kahn
ATTORNEY

INVENTOR.
JOHN V. BOUYOUCOS
BY
Martin Kaelin
ATTORNEY

INVENTOR.
JOHN V. BOUYOUCOS
BY
Martin L. Kaes
ATTORNEY

March 5, 1968 J. V. BOUYOUCOS 3,371,726

ACOUSTIC APPARATUS

Filed May 24, 1965 11 Sheets-Sheet 8

INVENTOR.
JOHN V. BOUYOUCOS

BY

ATTORNEY

INVENTOR.
JOHN V. BOUYOUCOS
BY Martin L. Kaeh[?]
ATTORNEY

March 5, 1968 J. V. BOUYOUCOS 3,371,726

ACOUSTIC APPARATUS

Filed May 24, 1965 11 Sheets-Sheet 10

INVENTOR.
JOHN V. BOUYOUCOS

BY

ATTORNEY

March 5, 1968 J. V. BOUYOUCOS 3,371,726

ACOUSTIC APPARATUS

Filed May 24, 1965 11 Sheets-Sheet 11

INVENTOR.
JOHN V. BOUYOUCOS

BY [signature]
ATTORNEY

United States Patent Office 3,371,726

Patented Mar. 5, 1968

3,371,726

ACOUSTIC APPARATUS

John V. Bouyoucos, Rochester, N.Y., assignor to General Dynamics Corporation, a corporation of Delaware Filed May 24, 1965, Ser. No. 458,245
35 Claims. (Cl. 173—134)

ABSTRACT OF THE DISCLOSURE

This application discloses percussive tools suitable for use in earth boring, pile driving and other applications. Tools utilize a hammer and anvil system wherein the hammer element is included within a hydroacoustic device which converts the flow of a pressurized fluid, such as hydraulic oil, into alternating mechanical energy as exhibited by oscillatory motion of the hammer element. The anvil element is spaced from the hammer element except when receiving impacts therefrom and extracts mechanical force pulses from the hammer element during alternate one-half cycles of the oscillatory motion of the hammer element. These force pulses are transmitted by the anvil system to the work. This transmission may be via a drill steel when the work is an earth formation which is being drilled.

The present invention relates to acoustic apparatus, and particularly to vibratory percussion or impact tools which are acoustically operated.

The invention is especially suitable for use in earth boring, as for drilling holes, tunnels or wells in earth formations. The invention also has application in machining, materials processing, metal forming, pile driving and other applications where mechanical energy of a repetitive impulse nature is usable.

Impact tools of the types which have been proposed include a hammer which is reciprocated by pressurized fluid. During the downward stroke the hammer impacts upon an anvil which may have a bit attached to the lower end thereof for drilling a hole in an earth formation by repetitively impacting the formation. Among the drawbacks of such prior impact tools is their low efficiency of operating power conversion and low frequency of impact repetition. The time which is required to drill a hole of the length which is generally required can be quite long. For example, a hole of ninety feet in depth, suitable for receiving a blasting charge generally requires over an hour to drill in limestone formations and longer in hard rock formations. If a gas is used as the drive fluid, relatively low hammer accelerating forces are available. As a result of such low accelerating forces impact repetition rate is limited, relatively long hammer strokes being required to develop sufficient driving forces on the anvil.

The efficiency of prior tools in converting operating power to useful work is limited by reason of the poor utilization of the thermodynamic cycle of the reciprocating hammer system. Also the anvil driving energy is produced during the downward hammer stroke and the principal part of the energy used to restore the hammer to its raised position is wasted. Known impact tools which use liquid as a driving fluid are similarly limited in impact repetition rate and efficiency.

Accordingly, it is an object of the present invention to provide improved acoustic apparatus which produces impulse mechanical energy with high efficiency and at a more rapid rate than known apparatus for producing such energy.

It is a further objective of the present invention to provide an improved percussion or impact tool which is acoustically operative.

It is another object of the present invention to provide an improved impact tool which provides high level impulse energy.

It is a still further object to provide an improved impact tool having higher energy conversion efficiency than known impact tools.

It is a still further object of the present invention to provide an improved impact tool which, when applied to drilling or earth boring, provides a higher drilling rate than tools which have been perviously developed.

It is a still further object of the present invention to provide an improved impact tool which is capable of providing higher velocity impacts on a load than known tools of this type.

It is a still further object of the present invention to provide an improved fluid actuated drilling tool in which the above-mentioned difficulties and disadvantages are substantially eliminated.

Briefly described, an impact tool embodying the invention includes a drive element, such as a hammer, the motion of which controls the flow of pressurized fluid. The hammer element converts the energy of the fluid which flows into the tool into alternating mechanical energy as exhibited by oscillatory motion of the hammer element at a resonant frequency of the acoustic system which includes the mass of the hammer element and the stiffness of the fluid adjacent to opposite ends of the hammer. The tool includes an anvil element which is decoupled from the hammer except when receiving impacts therefrom. In an embodiment of the tool the anvil element is disposed adjacent to and spaced from the hammer element. The lack of coupling of the elements except during impact permits the establishment of hammer element oscillatory motion at the resonant frequency of the acoustic system and provides for high energy conversion efficiency. Impact occurs during alternate half cycles of the hammer element's oscillatory motion. In the drilling application, a drilling bit may be attached to the lower end of the anvil element system. Other features of the invention provide for disposition of the anvil and hammer elements with respect to each other and means for applying pressurized fluid to the apparatus.

The invention provides a high repetition rate of impulse energy at high energy and force levels by virtue of the use of a resonant system including the hammer element. The resonant frequency of oscillation of the hammer may be of much higher frequency than obtained with previously proposed impact devices. By virtue of the resonant operation of the hammer element, alternating energy is stored in the acoustic system during all portions of the hammer's cycle of motion. At the upward extreme of the stroke of the hammer element, the alternating energy is stored principally in the fluid, and during the downward stroke this energy is stored in the hammer element. A portion of the stored energy is transferred to the anvil element during each impact on alternate half cycle. Such energy storage during all portions of the cycle of hammer motion permits the hammer valve mechanism to open for the discharge of fluid during that portion of the cycle when fluid pressure drop across the valving mechanism is low. Losses due to discharge of highly pressurized fluid are reduced and high efficiency of energy conversion is achieved. Since the hammer is resonantly oscillating, the velocity of the fluid flow under control of the hammer element does not limit the velocity of the oscillatory motion. By increasing the pressure, the force which is developed on the anvil by the hammer element may be increased.

The invention itself, both as to its organization and method of operation, as well as additional objects and advantages thereof will become more readily apparent from a reading of the following description in connection with the accompanying drawings in which.

Figures 19, 23:
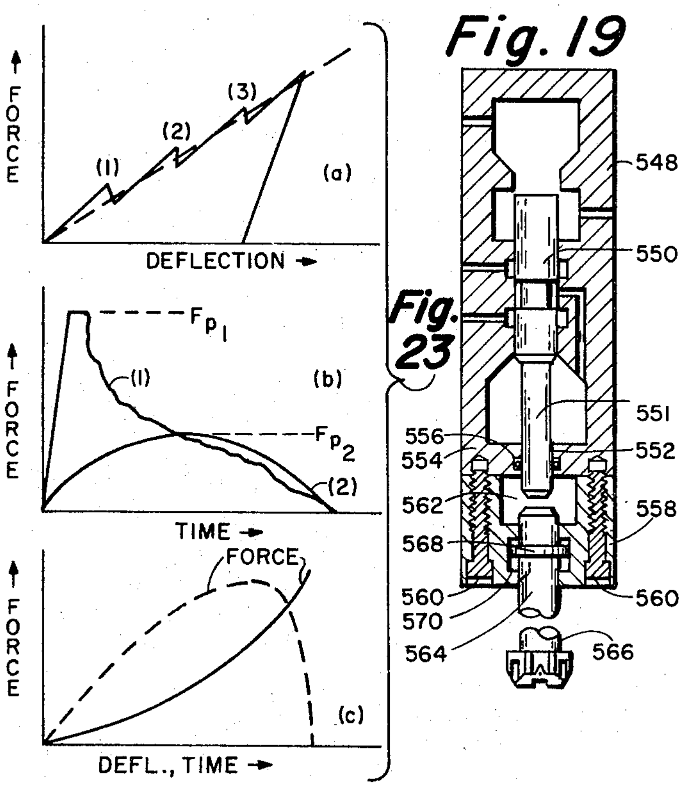
Figures 22, 24:
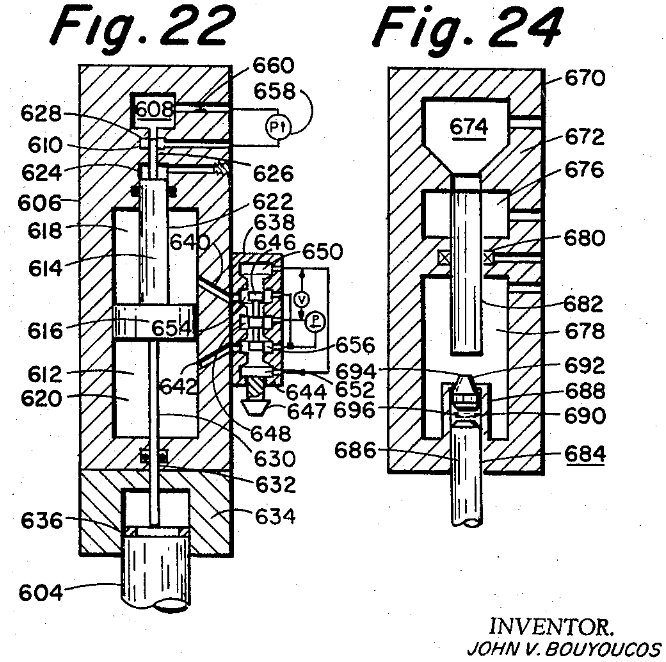

FIGS. 15 through 22, inclusive, are sectional views schematically illustrating still further embodiments of the invention, a different embodiment being shown in each of the views;

FIG. 23 is a graph illustrating the force transfer characteristics of an anvil element embodying the invention; and FIG. 24 is a sectional view schematically illustrating another embodiment of the invention having an improved anvil system.

Figure 1:
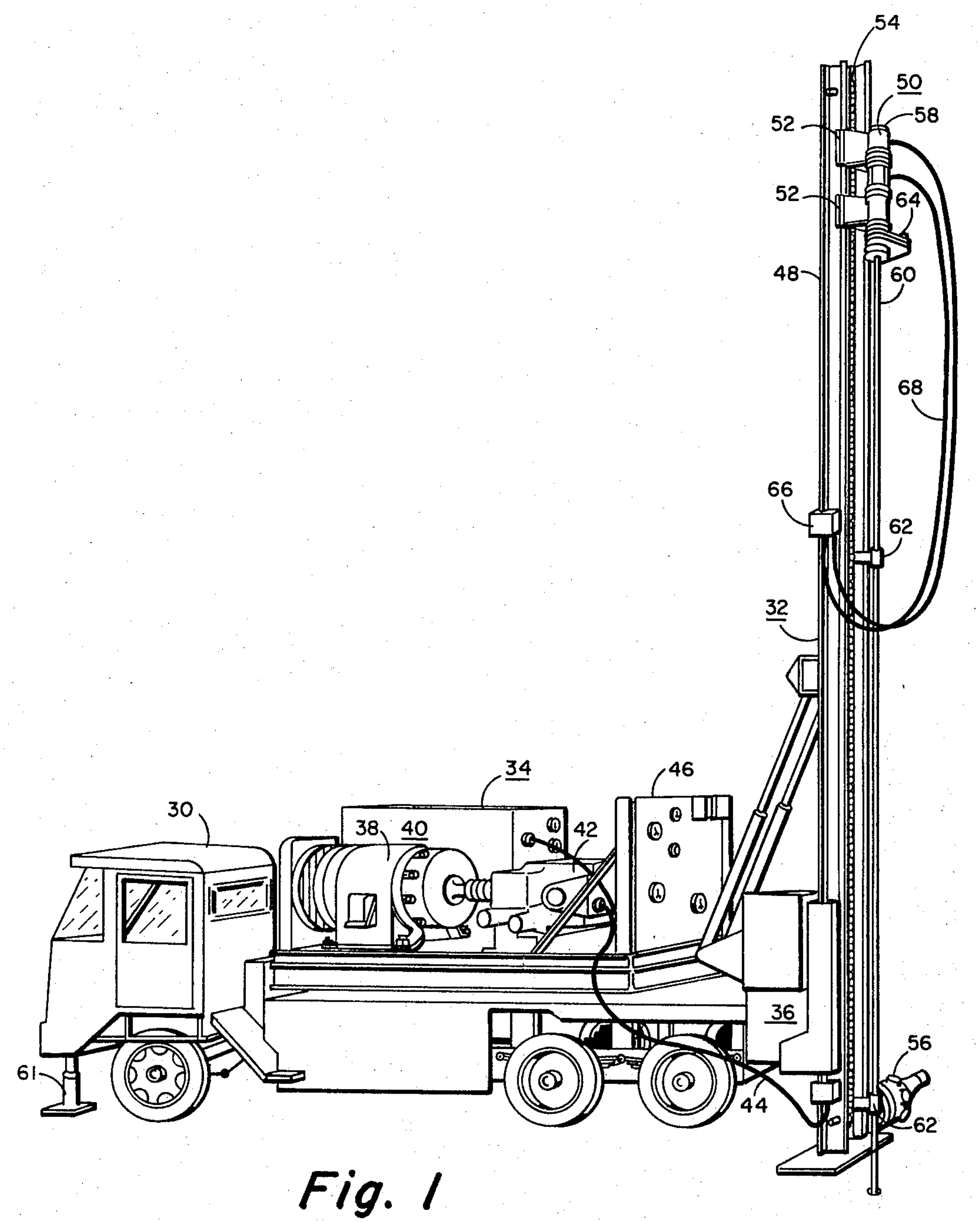
FIG. 1 is a perspective view of a drilling rig including a tool embodying the invention.

Referring more particularly to FIG. 1, there is shown a truck 30 which carries a drilling rig 32 and a pumping system 34 for the rig 32. The rig 32 is shown in upright or drilling position but may be pivoted about a journal mechanism 36 to a horizontal position on the bed of the truck 30.

The hydraulic system 34 includes a motor 38 which may be an internal combustion or electric motor which drives a hydraulic pumping system 42. The pump pressurizes fluid such as hydraulic oil which is drawn from a reservoir 40 and pumps the fluid over one of two hydraulic lines 44 to the drilling rig 32, the return line 44 being coupled to the reservoir 40. A control panel 46, also mounted on the bed of the truck, contains gages and controls for the pump 42.

The drilling rig 32 includes a column 48 of flanged beams which provides a track for guiding an impact or vibratory percussion tool 50. The tool is supported on brackets 52 which are guided by the flanges of the column 48. A chain drive, including a chain 54, driven by a motor 56, is used to move the tool 50 along the track, either downwardly into the hole or upwardly to extract the tool from the hole. To this end the brackets 52 may be attached to links on the chain 54.

The tool itself includes a housing 58. A drill steel 60, which is part of the anvil system of the tool extends through guides 62 downwardly into the hole. The guides may be attached to the column 48. The tool includes a motor 64 which may be a hydraulic motor, the hydraulic lines to which are not shown to simplify the illustration. The motor rotates the anvil system and thereby rotates the drill steel 60.

The hydraulic lines 44 from the pump 42 extend along the column. These lines may be of rigid tubing up to a junction box 66. Other flexible hydraulic lines 68 extend from the box 66 to the tool 50 and provide supply and return fluid passageways to the tool.

When the rig is operated for drilling a hole in an earth formation, the drive mechanism, including the motor 56 and chain 54, biases the tool downwardly so as to hold the bit at the end of the drill steel 60 against the formation. Drilling a hole to a depth of thirty feet, for example, may be executed by means of the tool in a matter of minutes. The motor 56 is then reversed and the drill steel extracted from the hole. The drilling rig may then be pivoted to horizontal position, the skid supports 61 removed from the truck and the rig moved to another drilling location. The illustrated rig is especially suitable for drilling blast holes into which blast charges may be inserted, such holes being used in quarrying, road building and other applications.

Figure 2:
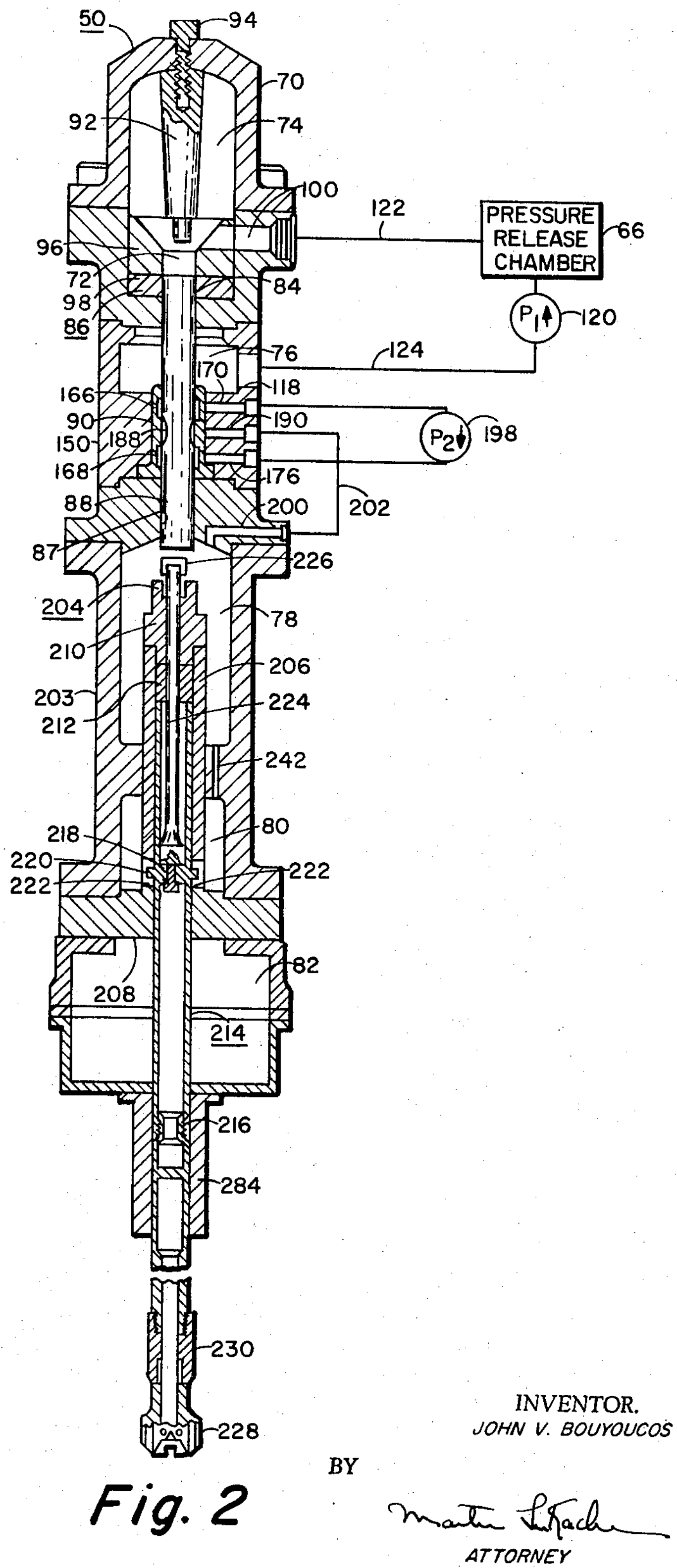
FIG. 2 is a simplified cross-sectional view of an impact tool embodying the invention, the tool being of the type shown in FIG. 1.
Figure 4:
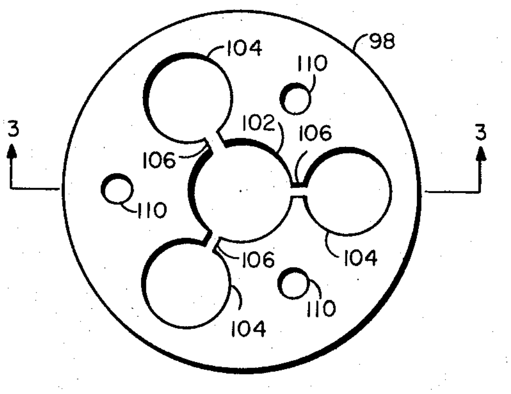
FIG. 4 is a plan view of a plate which forms a portion of the mechanism shown in FIG. 3.
Figure 3:
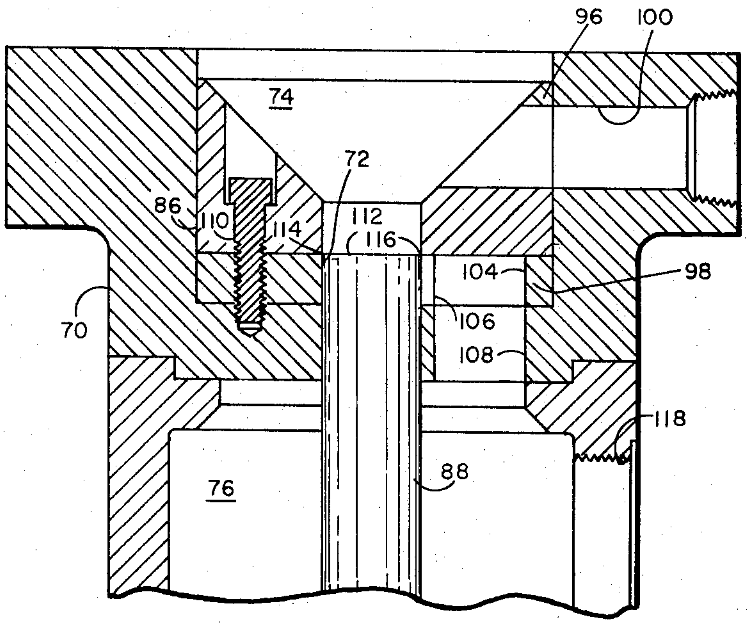
FIG. 3 is a fragmentary, sectional view of a portion of the tool shown in FIG. 1, the view being enlarged and taken along a plane perpendicular to the plane of the view of FIG. 2, to show the porting structure and the valve mechanism in greater detail, the view also being taken in the plane of the line 3—3 of FIG. 4 when viewed in the direction of the arrows.

The tool 50 is shown in FIG. 2. FIG. 2 has been simplified to a certain extent by eliminating detailed showings of certain parts, for example, the mechanism of the drive motor for rotating the anvil system. These parts will be described in greater detail hereinafter in connection with FIGS. 3–10. Accordingly, reference should be had to these figures as well as to FIG. 2 as the description proceeds. The tool includes a housing 70, made up of a plurality of housing sections which can be fabricated separately and bolted together, the bolts not being shown to clarify the illustration. A bore 72 extends along the longitudinal axis of the housing and through the lower end of the housing 70. A plurality of cavities are provided in the housing. These cavities are numbered 74, 76, 78, 80 and 82 in order from the upper to the lower ends of the housing. Cavities 74, 76, 78 and 80 are adapted to contain the pressurized fluid which may be the hydraulic oil provided by the pumping system 42 (FIG. 1) which includes pumps $P_1$ and $P_2$ to be described later. Fluid seals, such as O rings, which prevent escape of this fluid, are not shown to clarify the illustrations.

The bottom of the first cavity 74 is tapered and connects to a first portion 84 of the bore 72. This portion 84 contains a porting structure 86 and extends between the first cavity 74 and the second cavity 76. A second portion 87 of the bore extends between the second cavity 76 and the third cavity 78. A hammer element 88 is disposed in the first and second bore portions and is constrained to move along the longitudinal axis of the housing within the bore 72. A hydraulic circuit 90 in the second bore portion 87 controls the average position of the hammer element 88. This circuit will be referred to as a centering circuit hereinafter.

The hammer 88 is a massive cylindrical rod made of tough material such as alloy steel. The upper limit of motion of the hammer is set by a stop 92 which is a tapered cylindrical member secured by a screw 94 to the top end of the housing 70.

The porting structure 86 includes a cylindrical insert 96 (see also FIG. 3) and a disk 98 which serves as a porting plate. The insert 96 has a funnel-shaped opening which communicates with the first cavity 74 and forms the lower part thereof. A channel 100 which extends through the housing and the insert 96 has a threaded connector for receiving a hydraulic line. This connector provides a fluid passageway for fluid into the first cavity. The housing has a number of bleed ports and drain holes (not shown). The bleed holes may be opened while the housing cavities are filled with fluid and the drain holes may be opened when the fluid is removed as, for example, when the tool is being disassembled for servicing.

A circular opening 102 in the porting plate 98 constitutes that portion of the bore 72 which passes through the plate 98. The porting plate 72 also has three other openings 104 (FIG. 4) which communicate with the opening 102 by way of radial slots 106. The openings 104 are in alignment with similarly disposed openings 108 in the housing 70. The insert 96 and the porting plate 98 may be made of tough steel (a tungsten carbide material is also suitable) since the porting structure is subject to wear due to the flow of fluid therethrough. A plurality of bolts 110 may be used to hold the insert 96 and the porting plate 98 in place. Other screws not shown may be used to fasten the porting plate 98 to the insert 96.

The hammer 88 provides a valve mechanism for controlling the flow of fluid through the porting structure. The peripheral edge of the upper end 112 of the hammer 88 and the inner peripheral edge 114 of the lower end of the insert 96 form a variable area annular orifice 116, the area of which depends upon the position of the upper end of the hammer with respect to the edge, and through which the fluid can flow from the first cavity 74, through the slots 106 and through the openings 104 and 108 into the second cavity 76. A channel 118 in the housing provides a passageway for the flow (discharge) of fluid out of the second cavity 76. The portion 84 of the bore 72 between the first and second cavities 74 and 76 has a film of fluid on the surface thereof which provides a bearing surface for the hammer 88. The formation of this film may be assisted by means of a hydrostatic fluid bearing. Hydrodynamic fluid bearing action may also be provided by imparting a rotation of the hammer about its longitudinal axis.

A pump 120, which may be part of the hydraulic pumping system 42 (FIG. 1) feeds fluid under pressure to a pressure release chamber such as the chamber 66 (FIG. 1). This chamber may be a large liquid-filled chamber which presents a high acoustic compliance compared to the compliance of the fluid contained in the first cavity 74. Alternatively the pressure release chamber 66 may be provided by an accumulator device; for example, a casing having a volume of air or other compressible gas trapped in a bag or by a movable piston so that the gas is compressed as the pressure of the fluid in the chamber increases.

The chamber 66 is connected to the channel 100 by a hydraulic line 122 which forms part of the fluid passageway to the first cavity. This line 122 provides a fluid column of approximately one quarter wavelength at the operating frequency of the tool. This fluid column, together with chamber 66, serves to isolate the pump 120 acoustically from the first cavity 74. Another hydraulic line 124 provides a return passageway for fluid from the discharge channel 118 to the return side of the pump 120.

The hammer element 88 is self-excited into oscillation in the bore 72 along the axis of the housing by virtue of the flow of pressurized fluid through the porting structure 86. The mode of operation of the tool as respects hammer oscillation will be described more fully hereinafter.

Figure 5:
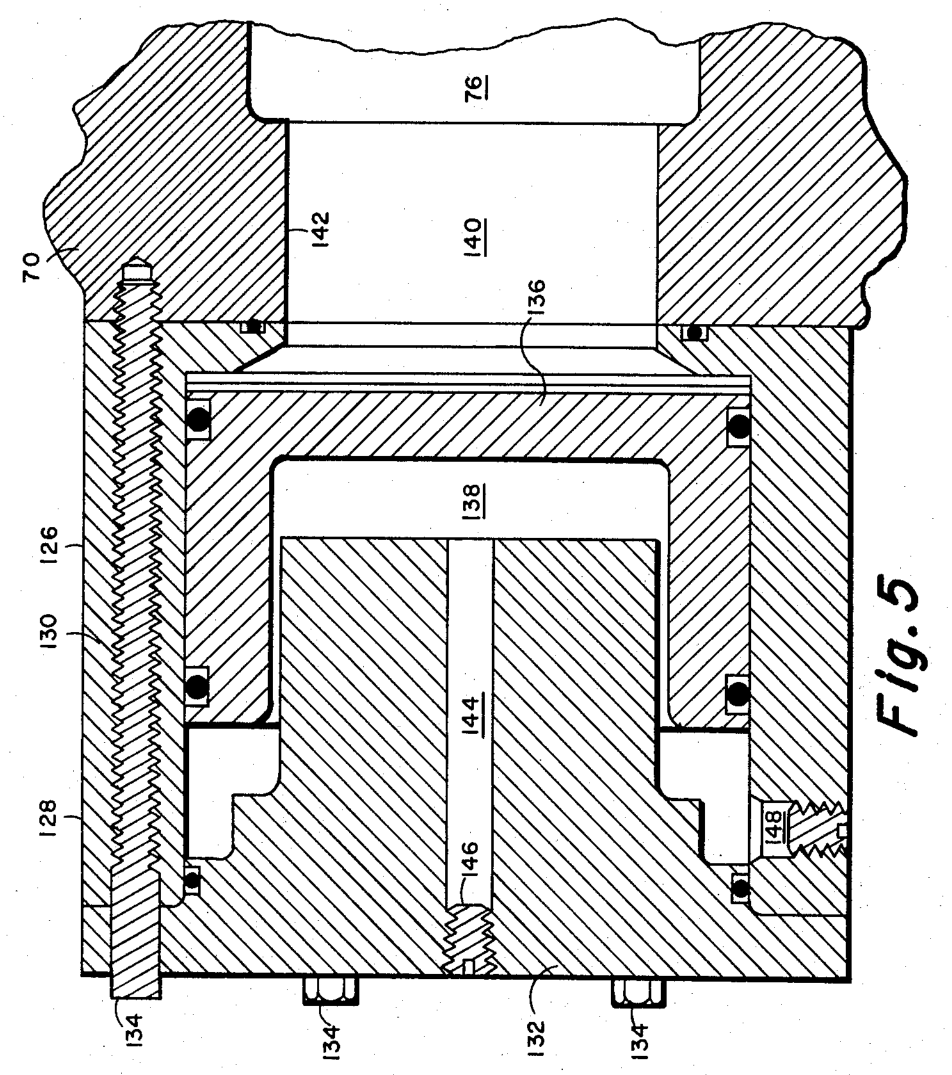
FIG. 5 is an enlarged, fragmentary, sectional view of the tool shown in FIG. 2, the view showing an accumulator mechanism.

The second cavity 76 is provided with a pressure release device in the form of an accumulator 126 which is shown in FIG. 5. The accumulator has a casing 128 provided by a cylinder 130 which is closed at its outer end by a flanged cylinder 132. A plurality of bolts 134 extend through the flange of the cylinder 132, and through the cylinder 130 and fasten the accumulator to the housing 70. A cup-shaped piston 136 divides the chamber in the casing 128 into two sections 138 and 140. The section 140 communicates with the second or discharge cavity 76 through a fluid passage 142 which enters the cavity 76 from the rear of the tool as shown in FIG. 2. Air or another compressible gas may be trapped in the section 138, after that section 138 is charged with the gas by way of a channel 144 which may be closed with a plug 146. This section may be drained by opening a plugged drain hole 148.

During the downward stroke of the hammer 88 fluid is injected from the first cavity 74 into the discharge or second cavity 76. The accumulator keeps variations in pressure in the second cavity 76 due to such fluid injection to a minimum and substantially eliminates cavitation of the fluid in the cavity 76. The accumulator 126 is charged with gas to a pressure slightly below the average pressure of the fluid in the cavity 76. The piston 136 may be made of aluminum and thereby has low mass.

Figure 6:
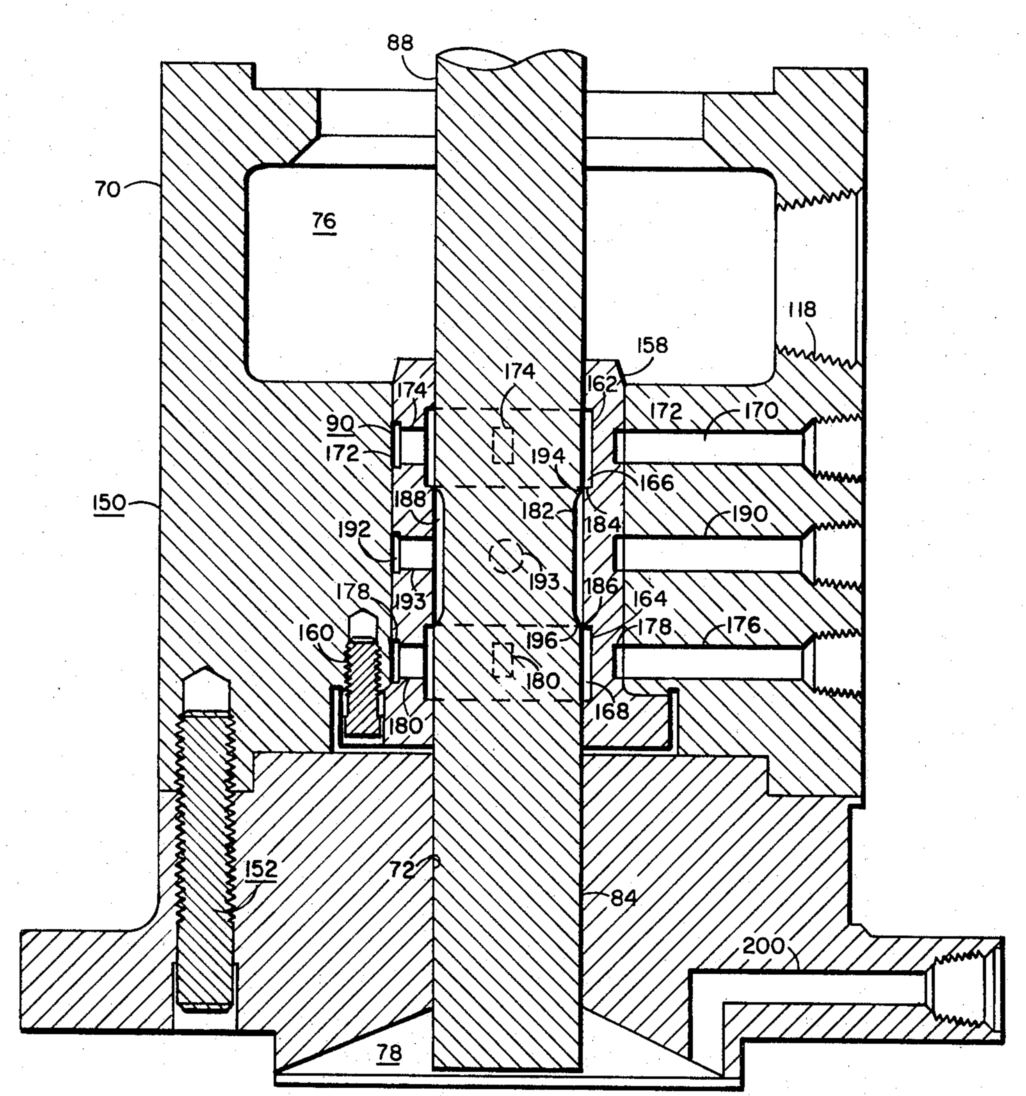
FIG. 6 is an enlarged, fragmentary sectional view showing the portion of the tool shown in FIG. 2 which includes the hydraulic circuit for controlling the position of the hammer element.

The housing 70 has a section 150 (shown in detail in FIG. 6) which contains that portion 84 of the bore 72 which extends from the second cavity 76 into the third cavity 78. This section 150 may be made up of two parts which are held together by bolts 152, one of which is shown in FIG. 6. Disposed in the bore portion between the second and third cavities 76 and 78 is the hydraulic centering circuit 90. This circuit controls the average pressure of the fluid in the lower cavity 78 in accordance with the average position of the hammer 88, thereby providing control over the average pressure differential between the fluid in the first and third cavities 74 and 78. An average restoring force is exerted on the opposite ends of the hammer 88, if the average position of the hammer deviates from a desired equilibrium position. This equilibrium position is that position where the upper end 112 of the hammer is in alignment with the inner peripheral edge 114 of the insert 96.

The centering circuit 90 includes a bushing 158 which is fastened to the housing section 150 by means of screws 160. The bushing 158 has two grooves 162 and 164 in its inner peripheral surface which define chambers 166 and 168 respectively. The housing section 150 has a line 170 which communicates with a groove 172 in the outer periphery of the bushing 158, the groove 172 being centered with respect to the groove 162. Slots 174 communicate the annular opening formed by the groove 172 with the chamber 166. Accordingly the line 170 provides a fluid passageway to the chamber 166. A similar arrangement of line 176, outer peripheral groove 178 and slots 180, provide communication through the housing to the chamber 168.

A groove 182, extending longitudinally a distance equal to the separation of the lower rim 184 and upper rim 186 of the grooves 162 and 164, is provided in the hammer 88. This groove 182 forms an annular chamber 188 between the hammer and the inner periphery of the bushing 158. Communication to this chamber 188 is provided by a line 190 through the housing section 150, a peripheral slot 192 in the bushing 158 and radial lines 193. When the rims 184 and 186 are in line with the upper and lower rims 194 and 196 of the groove 182, the hammer is in its equilibrium position. In this position, the upper rim 112 of the hammer 88 is also in line with the lower peripheral edge 114 of the insert 96 (see FIG. 3).

A pump 198 (FIGS. 2 and 6) has a supply connection to the line 176, which feeds the lower chamber 168, and has a return connection from the line 170 which communicates with the upper chamber 162. The central annular chamber 188 is in communication with the third cavity 78 by way of a fluid passageway including line 190, a line 200 in the housing section 150 and hydraulic line 202. The line 202 is constricted or of small diameter and presents an acoustic resistance which is large compared to the stiffness reactance of the fluid in the cavity 78 at the oscillation frequency of the hammer. Thus the line 202 and the cavity 78 constitute a filter which acoustically isolates the centering circuit from the acoustic system including the cavities 74 and 78 and the hammer 88.

The supply pressure provided by the pump 198 is suitably about twice the supply pressure provided by the pump 120. When the hammer is in its equilibrium position, the annular orifices defined by the rims 184 and 194, and the rims 186 and 196 provide a pressure divider in which the pressure due to the pump 198 drops equally across the valve orifice defined by the rims 186 and 196 and across the valve orifice defined by the rims 184 and 194. Accordingly the pressure in the chamber 188 is half the pump pressure. Since the third cavity 78 is in fluid communication with the center annular chamber 188, the pressure in the third cavity (when the hammer is in its equilibrium position) will be equal to the pressure in the first cavity 74. Accordingly, no average hydraulic forces are acting on the hammer. The only force required to be overcome is that of gravity. If the hammer 88 tends to move, on average, downwardly from its equilibrium position, the orifice defined by the rims 186 and 196 tends to open, while the orifice defined by the rims 184 and 194 tends to close. Hence, the resistance in the pressure divider defined by the orifice between the rims 184 and 194 would increase. The pressure in the chamber 188 increases toward the supply pressure of the pump 198. Accordingly, the pressure in the lower cavity 78 increases with respect to the pressure in the upper cavity 74, thereby establishing hydraulic forces for urging the hammer upwardly until the average force of the hammer is again reduced.

Should the hammer tend to move upwardly on average, as might result from a reduction of the average pressure in the upper cavity 74, the pressure in the center annular cavity 188 tends to decrease, thereby establishing a pressure differential which tends to restore the hammer to its equilibrium position.

By appropriate adjustment of the supply pressure of the pump 198, the equilibrium position of the hammer element can be changed so that different modes of operation may be obtained by controlling the time during the cycle of oscillatory movement of the hammer element that fluid may pass through the porting structure 86. Control over the equilibrium position of the hammer element has other advantages. It is desirable to provide biasing force on the hammer element to counteract impact reaction forces. If reaction forces on the hammer tend to thrust it in an upward direction on an average, the supply pressure of the pump 198 may be adjusted to provide a force tending to bias the hammer in a downward direction on average, thereby counteracting the effect of these reaction forces.

The section 203 of the housing 70 below the section 159 has a bore portion in which an anvil element or system 204 is disposed. The anvil system 204 which is shown in FIG. 2 and in greater detail in FIGS. 7 to 9, includes a sleeve 206 which is attached to the housing as by bolts 209 which extend through a lower flanged end 208 of the sleeve. A guide member 210 is secured, as by screws 211 to the upper end of the sleeve 206. A bearing mechanism 212 is located between the sleeve 206 and the bottom of the guide member 210 (see also FIG. 7). The anvil system 204 also includes a hollow cylindrical shaft 214, also known as the drill steel (see also FIG. 10). The shaft 214 is made up of a number of sections or subs which may be screwed together at joints, such as the joint 216. Together the subs provide the drill steel which is designated as 60 in FIG. 1. The shaft 214 is movable with respect to the sleeve 206. The upper end of the shaft 214 is disposed adjacent to the bearing mechanism 212.

Figure 8:
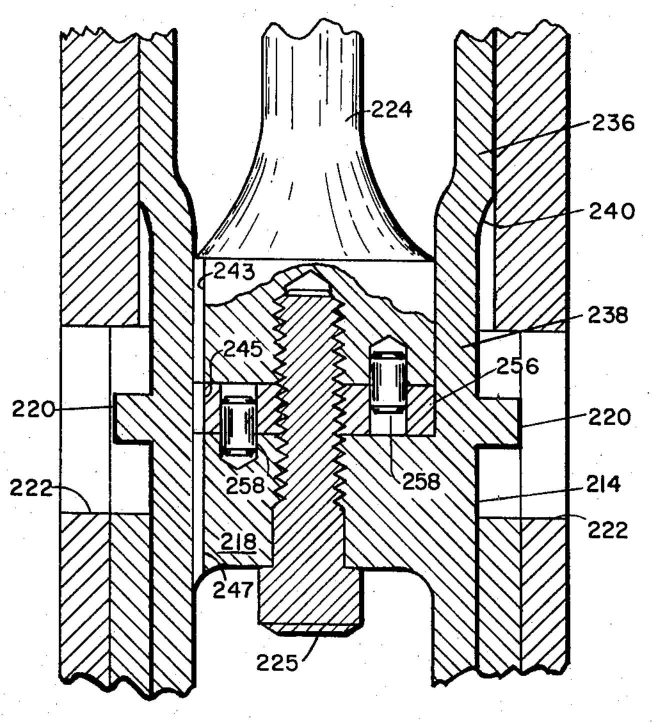
FIG. 8 is an enlarged, fragmentary, sectional view of a sub-portion of the anvil element shown in FIG. 7.

The shaft has a first web 218 across its inner periphery (see particularly FIG. 8). Projections 220 extend from the shaft 214 in the region of the web 218 through openings 222 in the sleeve 206 and serve as stops to limit the downward excursion of the anvil element.

The anvil element also includes a tapered elastic rod 224 of material such as titanium alloy which is secured by a screw 225 at the lower end thereof to the web 218. A cap 226 of tough steel on the upper end of the rod completes the anvil element. The rod 224 provides a compression spring for improving the transmission of impulse energy to the load, as will be explained more fully hereinafter.

A drilling bit 228 is attached to the shaft 214 by way of a massive coupling section 230, as shown in FIG. 2.

Except during impacts, the cap 226 which provides the upper end of the anvil system 204 is spaced from the lower end of the hammer element. This spacing is dictated by the bottom of the bearing plate 250 in the bearing mechanism 212. The projection 220 and the openings 222 dictate the lower limit of travel of the anvil system 204. The separation of the opposed ends of the hammer 88 and anvil system 204 is also insured by the centering circuit to the end that the hammer impacts the anvil and only on each cycle of the oscillatory motion of the hammer and only during the downward stroke of its oscillatory motion. The oscillatory motion of the hammer element is unimpeded, except during the fraction of the cycle when impact occurs. The hammer fluid cavity acoustic system stores alternating mechanical energy during the entire cycle of hammer motion. During impact a portion of such energy is imparted to the anvil system 204. This separation or decoupling of hammer and anvil is further advantageous in that the oscillatory motion of the hammer is not apt to be stalled during initiation of oscillations; viz. the anvil, by virtue of being decoupled from the hammer, does not extract alternating energy from the hammer until oscillation is definitely established.

The upper part of the anvil system 204 is located in the third cavity 78 which contains pressurized fluid. The impact surface of the anvil system 204 at the top of the cap 226 may be shaped, as by cross cuts, to reduce the losses associated with hydraulic squeeze effects before and after impact, and to minimize the possibility of cavitation as the hammer recedes from the immediate proximity of the upper end of the anvil system.

Figure 7:
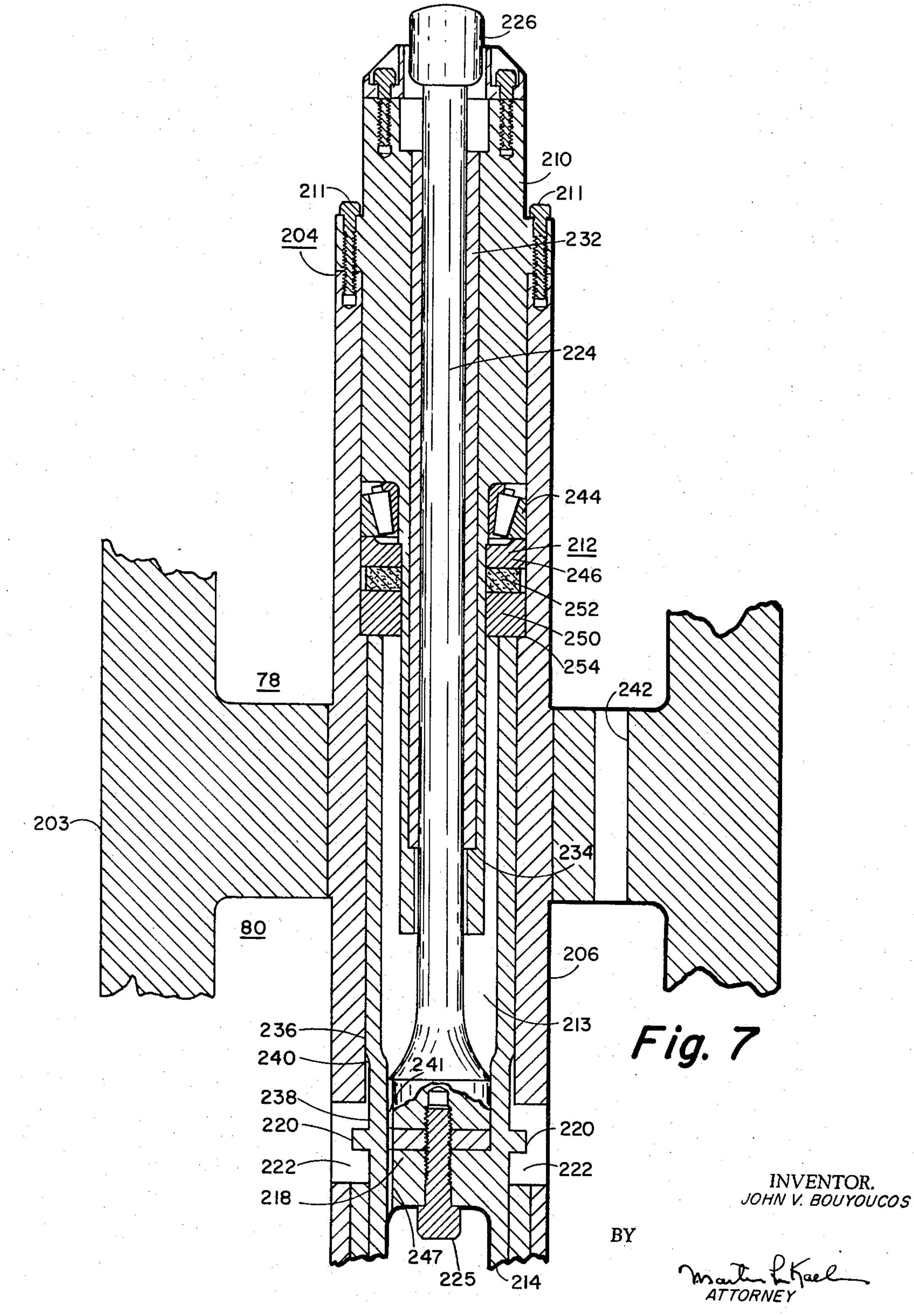
FIG. 7 is an enlarged, fragmentary, sectional view of the tool showing, particularly, the upper portion of the anvil element shown in FIG. 2.

The anvil system 204 is shown in somewhat greater detail in FIG. 7. A bearing sleeve 232 is disposed around the rod 224 over a substantial portion of its length. This sleeve may be made of tough plastic, such as Delrin, an acetal resin, which has Teflon (fluorocarbon resin) fibers dispersed therein, and provides a bearing surface for the rod. Alternate bearing structures may be used. For example a bushing shorter than the sleeve 232 to provide clearance for longitudinal anvil motion may slide on a bronze bushing attached to the guide 210. The bearing sleeve 232 is disposed within the guide member 210 and rests on a shoulder 234 of the guide member 210.

The drill steel shaft 214 is biased against the bearing mechanism 212 by a hydraulic biasing arrangement. The shaft 214 has a large diameter portion 236 and a smaller diameter portion 238 which define a peripheral shoulder 240 immediately above the web section 218 of the shaft 214. This shoulder 240 has a cross sectional area substantially equal to or slightly larger than the cross sectional area of the rod 224. By virtue of a narrow fluid passageway 242 (FIG. 7), which communicates the third cavity 78 with the fourth cavity 80, like average fluid pressures exist in both the third and fourth cavities. The interior portion 213 (FIG. 7) of shaft 214 is at atmospheric pressure due to a drain provided in channel 247 (FIG. 8) formed between the inner wall of the shaft 214 and flats 243 and 245 on the rod 224 and on a spacer disk 256, respectively, and a hole 247 in the web 218. The channel 247 communicates with the ambient atmosphere by way of the hollow interior of the shaft and holes 249 (FIG. 9) therein which lead to the ambient.

The net average hydraulic force on the anvil system is thus equal to the difference between the downward average hydraulic force on rod 224 and the upward average hydraulic force on shoulder 240. This net average hydraulic force is substantially zero because the area of the shoulder 240 exposed to the pressure in the cavity 80 is substantially equal to the cross-sectional area of the end of the rod 224. The shoulder 240 therefore provides a means for counteracting the downward force on the anvil system due to the pressure in the cavity 78, and for hydraulically balancing the anvil system. By providing different area relationships of the shaft 224 and shoulder 240, other degrees of imbalance may be achieved. For example by increasing the area of the shaft 224, a positive downward bias, which tends to retain the bit against the formation, may be developed. A suitable minimum downward bias may be five times the weight of the drill steel 214, rod 224, bit 228 and coupling section 230.

As a result of the hydraulic balance of the anvil system, moderate "pull-down" forces on the housing 70, as by the chain drive shown in FIG. 1, are sufficient to cause the anvil system 204 to translate upwardly into the range of the hammer. The weight of the shaft 214, rod 226 and other movable portions of the anvil will cause those portions to translate downwardly out of range of the hammer when the "pull-down" forces on the housing are removed. The upper and lower limits of the translation of the anvil system are set, respectively, by (a) the upper end of shaft 214 and the lower face of the bearing plate 250 and (b) the lower side of the projections 220 and the bottoms of the openings 222.

A film of fluid is provided between the outer periphery of the drill steel shaft 214 and the inner periphery of the sleeve 206. This film of fluid may be provided by virtue of drainage into the clearance between the sleeve 206 and the shaft from the cavities 78 and 80. Alternatively, a hydrostatic bearing may be provided between the sleeve 206 and shaft 214.

The thrust bearing mechanism 212 includes a roller bearing 244 which is held between the guide member 210 and sleeve 206 by a bearing plate 246. Another bearing plate 250 sandwiches a bumper plate 252 therebetween. The plates 246, 250 and 252 may be disks. The material of the bumper plate may be a suitable compressible material or a spring such as used in shock isolators of the type which are presently available. A shoulder 254 on the inner periphery of the sleeve 206 holds the plates and the bearing 244 in position against the lower rim of the guide member 210. The bearing mechanism isolates the housing 70 from shocks which would otherwise be transmitted thereto by way of the sleeve 206. In addition, the bearing 244 permits rotation of the drill steel shaft 214.

The connection between the drill steel shaft 214 and the base of the rod 224 is shown in FIG. 8. A bolt 225 through the web 218 fastens the bottom of the rod 224 to the web. A spacer disk 256 is disposed between the bottom of the rod 224 and the web 218. Pins 258 extend, one between the web and the pin and the other between the pin and the bottom of the rod 224, and couple the shaft 214 and the rod 224 so that they rotate together.

Figure 9:
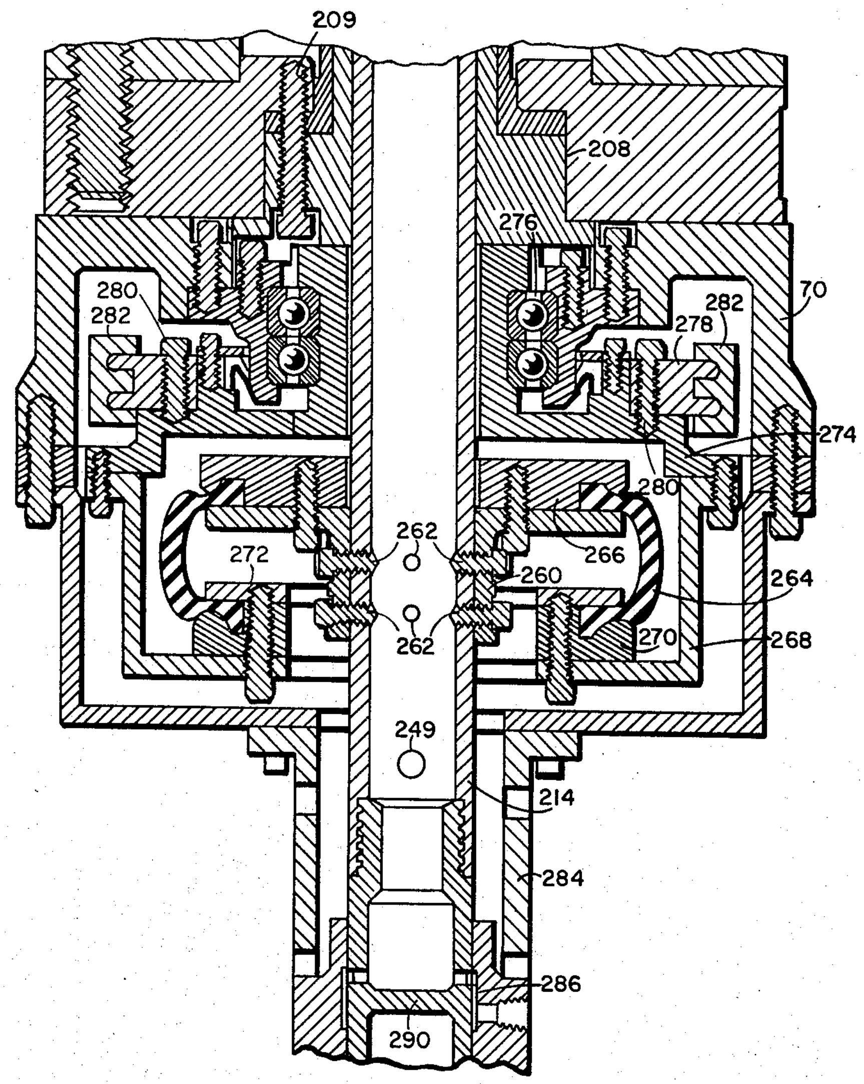
FIG. 9 is a fragmentary, sectional view of the tool shown in FIG. 2 which illustrates the mechanism for driving the anvil element in rotation.

The lower end of the housing 70 contains a mechanism for rotating the drill steel shaft 214. This mechanism is shown in FIG. 9. A flanged cylinder 260 is fastened to the drill steel shaft 214 by screws 262. A flexible coupling member 264, which is in the form of a torus, for example, of rubber which may be reinforced with cord, is clamped to the flange of the cylinder 260 by a hold-down plate 266 which engages the upper rim of the coupling member. The lower rim of the coupling member is fastened to a cup-shaped cover member 268 by means of a pair of hold-down plates 270 and 272, similar in shape to the flanged part of the cylinder 260 and the hold-down plate 266. The drill steel shaft 214 passes through an opening in the hold-down plates 270 and in the cover 268. A collar member 274 is fastened to the top of the cover 268. This collar is rotatably mounted on the housing by means of a ball bearing assembly 276. A sprocket wheel 278 is secured to the collar by means of screws 280. A drive chain 282 is driven by a hydraulic motor which was shown in FIG. 1 and indicated by the reference numeral 64. Since the drive is through the flexible coupling member 264 which may flex due to longitudinal (up and down) motion of the drill steel shaft, the rotation of the anvil element does not interfere with the longitudinal movement thereof in response to impact by the hammer 88.

Figures 10, 11, 12:
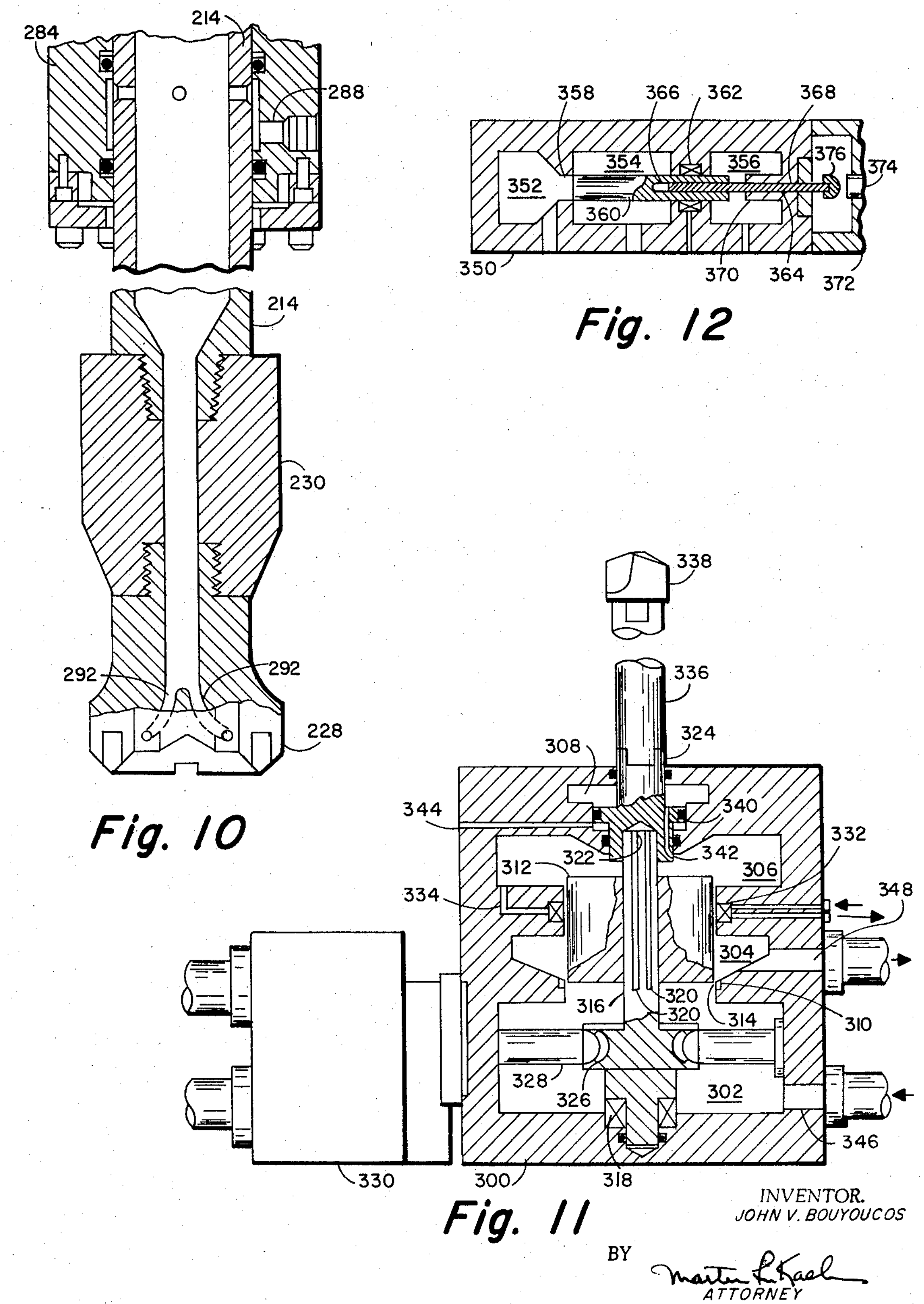
FIG. 10 is a fragmentary sectional view of the lower portion of the anvil element of the tool shown in FIG. 2 which shows in detail the drilling bit which is connected to the lower end of the anvil element.
FIG. 11 is a sectional view, schematically illustrating an impact tool embodying the invention which is especially suitable for drilling in the upward direction, the tool being useful as a roof drill.
FIG. 12 is a sectional view, fragmentary in part, which illustrates an impact tool in accordance with another embodiment of the invention.

The details of a casing 284 which depends from the housing 70 are shown in FIG. 9. The casing 284 includes channels 286 for draining the leakage fluid which enters into the hollow interior of shaft 214 from the cavity 80 by way of the clearance between the shaft 214 and the sleeve 206. As shown in FIG. 10, the casing includes a port 288. An air hose may be coupled to this port 288 and pressurized air circulated through the portion of the shaft between a lower web 290 (FIG. 8) and the bit 228. This air passes through jets 292 adjacent to cutting surface of the bit 228 and clears chips from the bottom of the bore hole in the formation by blowing such chips out of the hole.

The massive coupling section 230 (FIG. 10) is connected as by threaded couplings between the lower end of the drill steel shaft 214 and the drilling bit 228. The earth formation which loads the drill has been found to have a stiffness or spring characteristic. The massive coupling element provides a mass reactance which has been found to improve the transfer of impact energy to the load. A suitable value of mass for the coupling section 230 may be determined in accordance with the relationships mentioned hereinafter.

The operation of the tool may be commenced by first establishing a supply pressure to the centering circuit 90 by means of the pump 198. This may be accomplished by means of a valve accessible to the operator (see FIG. 1). The supply pressure to first cavity 74 from the first pump 120 is then increased. The hammer element then becomes free floating by virtue of the force balance on the hammer element due to the action of the centering circuit and the hydraulic bearings in the bore 72. As the pressure and flow from the pump 120 increases, oscillatory movement of the hammer 88 commences. As the pressure from the pump 120 is further increased, the amplitude of the oscillations of the hammer increases. The supply pressure from the pump 120 is further increased until the downward portion of the stroke of the hammer 88 increases sufficiently to impact the anvil. The pressure is then still further increased until the desired amplitude of impact force is obtained. The downward kinetic energy of the hammer 88 on impact is transferred through the anvil system 204, including the drill steel shaft 214 as a force pulse. This force pulse travels to the bit and then to the formation to be drilled.

The anvil system is, for the most part, a transmission line for transmitting the force pulses imparted by the hammer to the load which, in the illustrated case, is an earth formation. In other words, the impact of the hammer upon the anvil system does not result in a bodily movement of the system, as in pile driving where the pile moves bodily into the earth formation when struck by the pile driver. Rather, the anvil system is compressed incrementally. This incremental compression travels at the speed of sound along the rod 224 and drill steel 214 and is transferred by the bit 228 to the formation as a force pulse. A rock bit penetrating an earth formation has been found to exhibit an apparent stiffness characteristic while the force pulse is applied and is increasing in amplitude. The apparent stiffness is caused, in large part, by the stress pattern produced in the earth formation as it is penetrated by the tooth structure or other load-concentrating portion of the rock bit. Penetration of the formation by compressive loading produces a series of minute failures of the formation. After each failure, the tooth has penetrated further, and in each position of increased penetration is supported by a greater portion of the earth formation, which presents greater resistance to further penetration. This increase in resistance to penetration continues until, in the practical limit, the available force will cause no more penetration of the earth formation. This characteristic of apparent stiffness applies to most rock formations and also to most rock bits, including all known types that produce fracture of the formation by compressive loading of the formation in localized areas beneath their load-concentrating structures, such as may be wedge-shaped teeth, die-shaped teeth, conical teeth, or hemispherical teeth.

The deflection characteristic of the formation, as mentioned above, may be irregular. This irregularity, as pointed out, is attributable to successive deflection and fractures of different portions of the formation while the formation is subject to the force pulse applied by the various parts of the bit 228. FIG. 23(*a*) illustrates the irregular deflection characteristic by the solid line curve. The successive fractures are shown at 1, 2 and 3. The effective stiffness characteristic is shown by the dash line curve. The characteristic shown in FIG. 23(*a*) also illustrates that almost all of the energy absorbed during the application of force is retained (used in fracturing the earth formation or converted to sound or heat) and is not returned to the tool when the deflection is reduced to zero. This is demonstrated by the steep descending portion of the characteristic in FIG. 23(*a*). The enclosed area of the force-deflection characteristic represents absorbed energy. This type of characteristic is common essentially to all earth formations being penetrated by local crushing or chipping in a bore hole.

It has been discovered that, by (a) matching the impedance presented by the anvil system to the impedance of the earth formation due to its effective stiffness characteristic and (b) shaping the force pulse so that it is adapted to be absorbed by the formation in spite of the stiffness characteristic thereof, the deflection of the load per impact and the drilling rate can be improved. Pulse shaping is accomplished by the spring which is provided at the end of anvil system 204 which receives the impact. This spring is provided by the rod 224 (FIG. 2) and may be provided by the hydraulic spring shown in FIG. 24.

The shape of the force pulse provided by the rod 224 is such that the energy carried by the pulse is better absorbed than in the absence of the rod. FIG. 23(*b*), curve 1, illustrates the shape of the force pulse which would result if the hammer 88 impacts the drill steel 214 directly. Since the formation is effectively a stiffness, the force pulse shown in curve 1 is for the most part not absorbed. This results in reflections of the force pulse backwards along the drill steel. Multiple reflections of the pulse may occur both at the upper and lower ends of the anvil system. Such reflections are undesirable since they result in stresses which may cause excessive vibration and fatigue failures in the anvil system. Moreover, higher maximum force levels are required to obtain the desired energy transfer to the formation. A more desirable force pulse is shown in FIG. 23(*b*), curve 2. The energy absorbed by the formation from the pulse shown in curve 2 is about equal to that from curve 1, notwithstanding that the peak force is much lower in the case of curve 2. The use of a stiffness element such as the rod 224 provides advantages in that lower stress levels may be used to provide requisite energy levels to the load. The tool therefore has a higher drilling rate with lower impact velocity and anvil forces than would otherwise be required.

It has been found that providing the rod 224 having approximately the same stiffness as effectively provided by the formation results in the advantageous pulse shape described above. The range of rod stiffness which may be accommodated depends upon the mass of the hammer 88 and the impact velocity thereof. Such a range may be from one-fifth (1/5) to five (5) times the effective formation stiffness.

A preferred procedure for deriving the rod 224 stiffness characteristic is given below. This procedure is, of course, illustrative and does not limit the invention to a particular mode or understanding of its operation.

The effective stiffness of the load (including the formation) may be determined empirically by measuring the load deflection curve (see FIG. 23(*a*)) thereof. This stiffness is represented by a load spring rate $K_1$. The hammer 88 has a velocity at impact with the anvil system 204 which may be represented as $V_{imp}$. This impact velocity is, of course, determined by the oscillating system, including the mass of the hammer 88. Based upon the load deflection curve, a certain deflection $D_1$ is desired. In determining this desired deflection, the consideration is given to the concomitant force so that damage to the anvil system 204, including the bit 228, is precluded. A desired "force pulse frequency" $f_p$ may be derived from the relationship $$f_p=\frac{aV_{imp}}{2\pi D_1}$$

Where $a$ is a constant which depends principally upon the mechanical impedance of (1) the drill steel 214, (2) the rod 224 and (3) the hammer 88. A range of the constant $a$ from 0.2 to 0.8 may be suitable. A preferred value is 0.55.

The pulse frequency is dictated by the stiffness ($K_{imp}$) of the rod 224.

$$K_{imp}=\frac{(2\pi f_p)^2}{M_h}$$

Where $M_h$ is the mass of the hammer 88. The cross sectional area, S, of the rod 224 may be obtained from the following equation:

$$s=\frac{K_{imp}\,l}{P_c^2}$$

Where:

$l$ is the length of the rod;
$c$ is the velocity of sound in the rod 224; and
$P$ is the density of the rod 224.

In the illustrated tool the rod 224 is suitably about two centimeters in diameter, fifty centimeters in length and composed of titanium alloy.

It will be observed from FIG. 23(*a*) that the energy is absorbed by the formation which loads the tool during the ascending portion of the force pulse. Accordingly, it is desirable to reduce the duration of the trailing edge of the force pulse. This may be accomplished by means of a non-linear spring element such as a hydraulic spring, one form of which is illustrated in FIG. 24. This hydraulic spring provides a deflection characteristic illustrated in FIG. 23(*c*) by the solid line curve thereof. The resulting force pulse is shown by the dash line curve of FIG. 23(*c*). A detailed description of the tool embodiment shown in FIG. 24 is presented hereinafter.

The coupling section 230 is desirably selected so that the impedance matching criteria are satisfied, viz. the impedance of the load $X_L$ being equal to the mass reactance $X_M$ of the coupling section 230. Since the load reactance is equal to $$\frac{-jK_1}{2\pi f_p}$$

and $$X_M=j2\pi f_pM$$

it follows that a suitable value for M is:

$$\frac{K_1}{(2\pi f_p)^2}$$

A range of valves of mass for the coupling section 230 will be suitable, although the value obtained from the solution of the foregoing equation is preferred. The advantages in using the coupling section 230, as described above, are (a) greater force and energy amplitudes at the load, (b) reduced standing wave pattern, (c) lower stress levels in the anvil system 204, and (d) compatibility with a larger variety of loads. By way of example, the coupling section 230 may suitably have a mass of 59.2 pounds in the illustrated tool.

The anvil system repeatedly receives impacts from the hammer on each cycle of oscillation thereof. The frequency of operation of the tool is equal to the resonant frequency of the circuit which includes the mass of the hammer and the stiffness of the fluid in the first cavity 74 and in the third cavity 78. The cavities 74 and 78 provide fluid springs which, with the hammer, establish a resonant spring-mass system. As the fluid passes through the porting structure 86 under the control of the hammer-valve mechanism, this resonant system is excited. Oscillatory movement of the hammer continues so long as pressurized fluid passes through the system. The amplitude of the oscillatory motion is not limited by the velocity of the fluid flow from the pumps. Rather, the amplitude of oscillation is dictated by the pressure at which the fluid is supplied.

The mode of operation of the tool may be more fully understood by the sequence of events which occur during such operation. Immediately following impact between the opposed ends of the hammer 88 and anvil system 204, the pressure in the third cavity 78 is higher than the average pressure therein. The higher pressure is a function of the product of the cross sectional area of the hammer and the downward displacement of the hammer from its equilibrium position to impact position. The instantaneous pressure in the first cavity 74 is simultaneously lower than the average pressure therein as a result of the downward displacement of the valve from its equilibrium position and also as a result of the opening of the orifice 116 (FIG. 3) which permits flow from the cavity 74 into discharge cavity 76.

The reaction force on the hammer due to its impact with the anvil system, the reduced pressure within the cavity 74 and the increased pressure in the cavity 78 causes the hammer 88 to move upwardly into the cavity 74. The hammer passes its equilibrium position and decelerates as the fluid in the cavity 74 becomes compressed. Simultaneously the fluid pressure in the third cavity 78 is instantaneously reduced below its average value. The pressure in the first cavity 74 is also increasing as a result of the constant supply of fluid through the fluid passageway provided by the channel 100 and the line 122. This fluid passageway does not influence the acoustic circuit of the cavity 74 because of its quarter wavelength length at the operating frequency. Accordingly, the fluid flow introduced by way of the passageway is a constant flow even though the pressure in the cavity 74 is alternating about the average supply pressure at the operating frequency. The net increase in pressure in the cavity 74, together with the reduction of pressure in the third cavity 78, both with respect to the average pressures in these cavities, creates a downward force on hammer 88 which arrests its upward motion and drives the hammer downwardly. The hammer passes its equilibrium position with increasing velocity and ultimately impacts upon the anvil.

The limitation on the energy that can be transferred in a single impact is primarily imposed by the strength of the drilling bit and drill shaft 214 rather than the hammer and anvil system. The tool delivers impact blows at much higher frequencies than prior tools. Accordingly the performance of the tool in terms of drilling rate is much higher than that of known tools. The efficiency of operation also enhances the drilling rate.

FIG. 11 illustrates an impact tool which is especially suitable for use as a roof drill, such roof drills having application in mining for drilling holes in mine shaft roofs in which supporting roof bolts may be secured. This tool includes a housing 300, having first, second, third and fourth cavities, 302, 304, 306 and 308. A bore portion which extends between the cavities 302 and 304 defines a porting structure 310. A hammer element 312 is disposed in the bore portion. The lower rim of the hammer element and the porting structure defines the valve orifice 314. The hammer 312 has a bore therethrough along the longitudinal axis thereof. A shaft 316 extends through the bore and is supported by a bearing 318 in the lower end of the housing 300. Splines 320 in the upper portion of the shaft engage slots 322 in an anvil element 324; the shaft 316 thereby being rotatably coupled to the anvil element. The anvil element is also free to move longitudinally by virtue of the spline coupling.

A sprocket gear 326 is mounted on the shaft 316. This gear may be driven by a worm gear carried by a horizontal shaft 328, which is driven by a hydraulic motor 330.

A hydraulic centering circuit 332 similar to the circuit shown in FIG. 6 may be provided for establishing an equilibrium position of the hammer element with its lower rim in line with the rim which provides the porting structure. The center cavity of the centering circuit 332 is connected by means of a fluid passageway 334 to the third cavity 306.

The lower end of the anvil is connected directly or by way of a drill steel 336 to a drilling bit 338. The anvil has a flange 340 which separates the fourth cavity 308 into two sections. The upper section is in communication with the third cavity 306 by way of a fluid passageway 342 in the anvil. A passage 344 between the lower section of the cavity 308 and the ambient, communicates the lower section with the atmosphere. The area of the flange 340 is greater than the area of the lower end of the anvil. Since the upper section of the cavity 308 and the cavity 306 are in fluid communication with each other, there is equal fluid pressure in the upper section and in the cavity 306. A biasing force in a downward direction is therefore established by virtue of the difference in areas. Pressurized fluid is supplied through the fluid passageway 346, passes through the orifice 314 and is discharged through the fluid passage 348. This pressurized fluid flow enables oscillatory motion of the hammer 312, the mode of operation being similar to that described above in connection with FIGS. 1–10. The anvil is rotated by the motor 330 through the shafts 328 and 316 by way of the gearing on these shafts. The housing 300 may be mounted on a lift mechanism. As the drilling bit 338 drills into the formation, this lift mechanism urges the housing upwardly towards the roof being drilled.

Referring to FIG. 12, there is shown an impact tool according to another embodiment of the invention. The tool includes a housing 350 having first, second and third cavities, 352, 354 and 356. A bore extends between first and second cavities and also between the second and third cavities. The portion of the bore between the first and second cavity includes a porting structure 358. A hammer element 360 provides a valve mechanism in this porting structure. A centering circuit 362 is also provided which may be similar to the centering circuit 90 (FIG. 2). Fluid passageways, similar to those shown in FIG. 2, are provided to the centering circuit and to each of the cavities.

The hammer element 360 is a bi-part structure. One part of the hammer element is provided by a rod 364 which extends into a blind hole 366 along the longitudinal axis of the hammer element. The rod 364 may be held in the hole 366 by press fit or by threaded connection.

The rod 364 extends out of the end of the housing 350 by way of a bore 368. A sleeve 370, which extends into the cavity 356, may also be provided for guiding the rod 364.

A casing 372, adjacent to the housing 350, locates an anvil element 374 with the end of the anvil element spaced from the free end of the rod 364. An impact cap 376 of tough alloy steel may be provided on the end of the rod 364 for protective purposes. The mode of operation of the tool under fluid pressure supplied through the housing by way of the fluid passages therein is similar to the operation described in connection with FIGS. 1–10. However, the pressure supplied by the centering circuit 362 to the cavity 356 is higher than the average pressure supplied to the cavity 352 in order to compensate for the difference in hammer areas exposed to pressure in the cavities 352 and 356 at the opposite ends of the hammer 360. In operation the pressure in the cavity 356, which is supplied by the circuit 362, to compensate for the average reaction forces on the hammer due to successive impacts. The initially higher pressure in the cavity 356 is helpful in avoiding cavitation as may arise from such decrease in pressure in the cavity 356.

Figure 13:
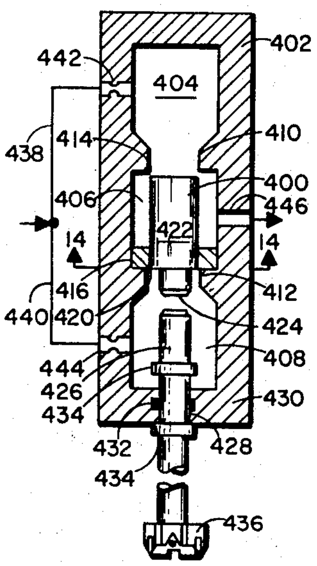
FIG. 13 is a sectional view schematically illustrating an impact tool in accordance with still another embodiment of the invention.

FIG. 13 illustrates an impact tool including a hammer element 400 and an arrangement for feeding fluid through a housing 402 in such a way that the hammer element 400 is driven in push-pull. The housing 402 itself includes three cavities 404, 406 and 408. The second or intermediate cavity 406 is connected by bore portions 410 and 412 to the first and third cavities 404 and 408 respectively. A porting structure is provided in each of the bore portions 410 and 412. The porting structure in the upper bore portion 410 is provided by the lower peripheral edge or rim of the bore portion, which, with the upper peripheral edge of the hammer element 400 defines a valving orifice 414.

Figure 14:
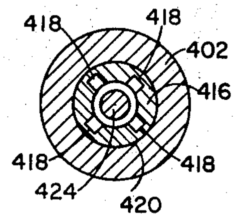
FIG. 14 is a sectional view of the tool shown in FIG. 13. the section being taken along the line 14—14 of FIG. 13 when viewed in the direction of the arrows.

The lower bore portion 412 includes a porting plate 416 which, as shown in FIG. 14, is an annular disk having radial slots 418. A lower valve orifice 420 is defined by the upper rim of the lower bore portion 412 and the lower edge 422 of the hammer element 400. This lower orifice 420 has a smaller perimeter than the upper orifice 414, the orifice perimeter being defined by the perimeter of the slots 418.

The hammer element 400 has a boss 424 which, when the hammer is in its operating high amplitude mode of oscillation, impacts against the upper end of an anvil system 426. The anvil system is illustrated as a rod which extends through a bore portion 428 in the lower end 430 of the housing 402. A fluid seal 432 prevents the escape of fluid from the lower cavity 408 while permitting up and down movement of the anvil 426. Stops 434 in the form of flanges on the anvil rod may be used to prevent the rod from leaving the housing 402 and also establish the limitation of travel of the rod.

It is assumed that the housing, 402, will be biased in the downward direction so as to keep a drilling bit 436 or other similar operating device in contact with the earth formation or any load with which the tool is designed to operate. Accordingly the anvil 426 will normally be in the position shown in FIG. 13 with the lower stop 434 referenced against the bottom of the housing 402.

Fluid such as the hydraulic oil mentioned above, is supplied from the supply side of a pump to a pair of hydraulic lines 438 and 440. The lines 438, 440 are connected at one end to a common feed point and at their other ends to channels 442 and 444, respectively. The channel 442 and the line 438 provide one fluid passageway to the first cavity 404. The line 440 and the channel 444 provide the second fluid passageway to the third cavity 408. The lines 438 and 440 between the feed point and the channels 442 and 444 may be one quarter wavelength long at the operating frequency of the tool, viz. the resonant frequency at which the hammer element 400 oscillates. A channel 446 communicates the second cavity 406 with the return side of the pump.

The channels 442 and 444 are constricted to present flow resistances in the fluid passages to the cavities 404 and 408. These resistances have two functions, namely, (a) to provide for centering of the hammer element 400, and (b) to prevent the transient excitation of an undesirable mode of oscillation at a frequency lower than the desired operating frequency of the oscillating system, including the valve element 400 and the fluid in the cavities 404 and 408.

The low frequency, undesirable mode of oscillation would be established by the secondary circuit including the inertance of fluid passageways 438 and 440 and the inertance of the hammer element 400 which are in series with each other and also in series with the hydrodynamic flow stiffness presented to the motion of the hammer element 400. This stiffness is a result of the flow of fluid through the orifices 414 and 416. The flow resistances in the channels 442 and 444 are in series with the abovementioned inertances and stiffnesses and have values which effectively damp transient oscillation at the low frequency at which this secondary circuit is resonant. A suitable value for the sum of the resistances presented by the channels 442 and 444 is one which would be equal to or larger than the stiffness reactance arising from hydrodynamic flow stiffness presented to the motion of the hammer at the resonant frequency of the secondary circuit.

The fluid feeding arrangement also provides a bridge circuit for direct current or steady flow of hydraulic fluid, which establishes and maintains the equilibrium position of the hammer element 400. One side of the bridge circuit may be traced from the common feed point to the lines 438 and 440 through the flow resistance of channel 442 and the flow resistance of the upper orifice 414 to the discharge channel 446. The other side of the bridge circuit may be traced from the common feed point through the flow resistance of channel 444 and the flow resistance of the lower orifice 420 to the discharge channel 446. The resistances presented by the channels 442 and 444 present two bridge arms and the orifices 414 and 420 provide the other two bridge arms.

The mode of operation of the centering circuit will be more apparent from the following sequence of events which are exemplary of a mode of its operation. If the hammer 402 tends to move upward on the average, the average flow through the lower orifice 420 tends to increase and the average flow through the upper orifice 414 tends to decrease. As a consequence, the average pressure drop across the resistance presented by the constriction 444 tends to increase while the average pressure drop across the resistances presented by constriction 442 tends to decrease. Accordingly, the average pressure in the lower cavity drops while the average pressure in the upper cavity 404 increases. This asymmetrical change in the average pressures in the upper and lower cavities causes an imbalance in the average forces on the hammer 400 which tend to bias the hammer back to its equilibrium position. This equilibrium position is that position of the hammer where the upper and lower ends of the hammer 400 are in line respectively with the lower rim of the upper bore portion 410 and the upper rim of the lower bore portion 412. The upper rim of the lower bore portion 412 is that rim which is adjacent to the porting plate 416.

As mentioned above, the porting area of the lower orifice 420 is smaller than the porting area of the upper orifice 414. This reduction in porting area lends itself to greater overall tool efficiency by reducing the average flow through the lower orifice 420.

Although the centering bridge circuit tends to restore the hammer 400 to equilibrium position, the reaction force on the hammer due to successive impacts is such that, on average, the lower orifice 420 is open for a larger part of the cycle of hammer oscillation than the upper orifice 414. Accordingly, the efficiency of power conversion at the upper orifice 414 is higher than at the lower orifice. The flow through the lower orifice 420 is restricted by the porting plate 416. By virtue of this reduction in flow, the above-mentioned increase in overall efficiency is obtained.

Figure 15:
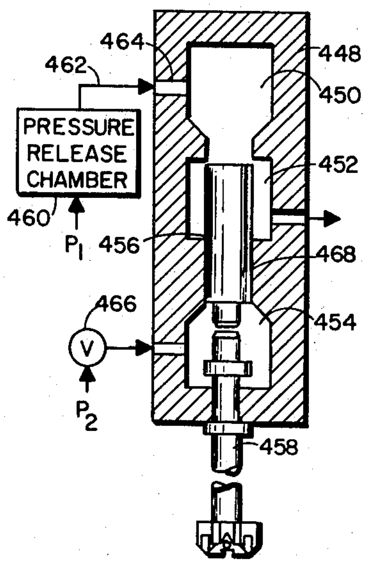

FIG. 15 illustrates another impact tool having a housing 448, an upper cavity 450, an intermediate cavity 452, and a lower cavity 454. The hammer 456 is disposed in the housing and arranged to impact an anvil system 458. The design of the hammer and anvil system is similar to the design of the system shown in FIGS. 1–10 and will therefore not be described in detail in connection with FIG. 15. The arrangement for supplying pressurized fluid to the cavities 450 and 454 provides for independent control of cavity pressure. The main driving energy is obtained from a source of hydraulic fluid indicated at $P_1$ which supplies fluid to a pressure release chamber 460. This chamber may be similar to the chamber 66 (FIG. 2). A feed line 462 which is a quarter wavelength long at the operating frequency of the tool connects the pressure release chamber 460 to the upper cavity 450 by way of a channel 464. The discharge from the second cavity 452 may be returned to the pump $P_1$.

The pressure in the lower cavity 464 is supplied by a pump indicated at $P_2$ which is connected to the cavity 454 through a valve 466. The portion of the bore 468 which connects the second and third cavities 452 and 454 has a fluid seal so that the cavities 452 and 454 are isolated from each other. By adjusting the valve 456, the pressure in the lower cavity 454 may be selected arbitrarily to enable the position of the hammer 452 to be independently controlled. The valve 456 provides sufficient acoustic resistance to isolate the pump from the alternating pressure variations in the cavity 454. The hammer has a resonant frequency of oscillation determined by the stiffness of the fluid in the upper and lower cavities 450 and 454 and the mass of the hammer 456 itself. The valve 466, by providing independent control of the position of the hammer element, enables proper startup to be achieved, as well as adjustment of the equilibrium position of the hammer to compensate for different loads which the anvil 458 may encounter.

Figure 16:
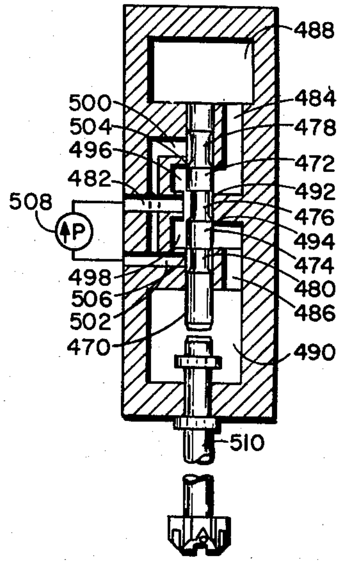

Referring to FIG. 16, there is illustrated an impact tool having another arrangement for driving the hammer element thereof in push-pull and for establishing the equilibrium position of the hammer element. The hammer element 470 in this arrangement includes a four-way valve which constrains the tool to only one mode of oscillation, in a manner similar to that described with respect to FIG. 13. Whereas the single mode of oscillation is obtained in the case of FIG. 13 through the introduction of fixed flow resistances in the upper arms of a bridge circuit, the identical constraint is obtained in FIG. 16 in a bridge circuit in which all arms are variable resistances. As a result of the four-way bridge circuit, not only is the single mode of oscillation achieved, but improved centering action of the hammer is obtained.

The four-way valve includes a pair of lands 472 and 474 which are separated by an intermediate groove 476 and which are respectively adjacent upper and lower grooves 478 and 480. An inlet fluid passageway 482 can communicate through upper and lower fluid passageways 484 and 486 to upper and lower cavities 488 and 490. The upper and lower ends of the hammer 470 are respectively exposed to the upper and lower cavities 488 and 490. The fluid stiffnesses presented by these cavities 488 and 490 and the mass of the hammer element 470 determine the resonant frequency at which the hammer 470 executes its oscillatory motion.

The communication between inlet passageway 482 and the upper and lower passageways 484 and 486 is through variable area annular orifices 492 and 494 respectively. These orifices 492 and 494 are defined by the lower and upper rims of the lands 472 and 474 respectively and the lower and upper rims respectively of the grooves 496 and 498. These grooves 496 and 498 have length dimensions, measured along the longitudinal axis of the housing, equal to the lengths of the lands 472 and 474.

Another pair of fluid passages 500 and 502 are provided for discharge of a fluid from the cavities through discharge orifices 504 and 506 which are defined between the upper and lower rims of the lands 472 and 474 respectively and the upper and lower rims of the grooves 496 and 498. A pump 508 has supply and return connections to the inlet fluid passageway 482 and the discharge passageways 500 and 502.

During oscillation, as the hammer 470 displaces downward, the feed orifice 494 to the lower cavity 490 is opened, while the discharge orifice 506 from the lower cavity 490 is closed. Simultaneously, the discharge orifice 504 from the upper cavity 488 is opened while the corresponding feed orifice 492 is closed. On the other hand, as the hammer displaces upwardly, the feed orifice 494 to the lower cavity 490 is closed while the discharge orifice 506 from lower cavity 490 is opened. Simultaneously, the discharge orifice 504 from upper cavity 488 is closed while the corresponding feed orifice 492 is opened. Accordingly, during any one-half cycle, only the feed orifice to one cavity and the discharge orifice from the other cavity is open. The only fluid connection between the cavities 488 and 490 is, thus, through (a) the discharge orifice then operatively associated with one of the cavities, (b) the associated pumping system, and (c) the feed orifice then operatively associated with the other cavity. The cavities 488 and 490 are, therefore, acoustically isolated from one another through the large feed and discharge orifice resistances. Hence, the only degree of freedom for oscillation is that defined by the mass of the hammer 470 and the stiffnesses presented by the fluid in the upper and lower cavities.

The four-way valve included in the hammer 470 also defines a bridge circuit for steady or direct current fluid flow through the tool which is operative to control the position of the valve and center the valve in an equilibrium position where the rims of the housing grooves 496 and 498 are in line with the rims of the lands 472 and 474. Thus, for example, if the average reaction forces on the hammer, due to repetitive impact on the anvil system should tend to displace the average position of the hammer 470 upwardly, the feed orifice 472 to the upper cavity will be open for a greater portion of the oscillation period than the associated discharge orifice 504. The effective resistance present by that orifice therefore decreases. As a result, the average pressure in the upper cavity 448 will change in the direction of the supply pressure of the pump 508. Simultaneously, the feed orifice 494 to the lower cavity 490 will be open for a lesser portion of the oscillation period than is the associated discharge orifice 506. The resistance of the orifice 494 effectively increases. As a result, the average pressure in the lower cavity 490 will change in the direction of the discharge pressure at the return of the pump 508.

The increased average pressure in the upper cavity 488 and the reduced average pressure, due to the unbalance of the bridge circuit provided by the orifices, will act upon the hammer 470 to force it, on the average, to move downwardly toward its equilibrium position until balance in the bridge is restored. The hammer element is thus statically balanced while exhibiting dynamic instability resulting in oscillation at the resonant frequency of the system.

The hammer 470 is affected by both positive and negative damping forces due to flow through the feed and discharge orifices. The discharge flow through orifices 504 and 506 causes negative damping of the hammer due to the transfer of momentum from the fluid to the hammer as the fluid passes through the annular regions around the grooves 478 and 480. The supply flow through orifices 492 and 494 presents a positive damping in the hammer due to the transfer of momentum from the fluid to the hammer, as the fluid passes through the circular regions around the grooves 476. To enable the negative damping to exceed the positive damping and thereby to aid the self-oscillatory action of the tool, it is desirable to make the upper and lower grooves 478 and 480 longer than intermediate groove 476, so that the distances from the discharge orifices 504 and 506 to the centers of the discharge passages 500 and 502 along the longitudinal axis of the housing are greater than the distances from the center of inlet passage 482 in a direction along the axis of the housing to the feed orifices 492 and 494, respectively.

An anvil system 510, similar to the system 428 (FIG. 13) may be provided for coupling the alternating mechanical energy stored in the hammer element to a load, such as an earth formation.

Figures 17, 18:
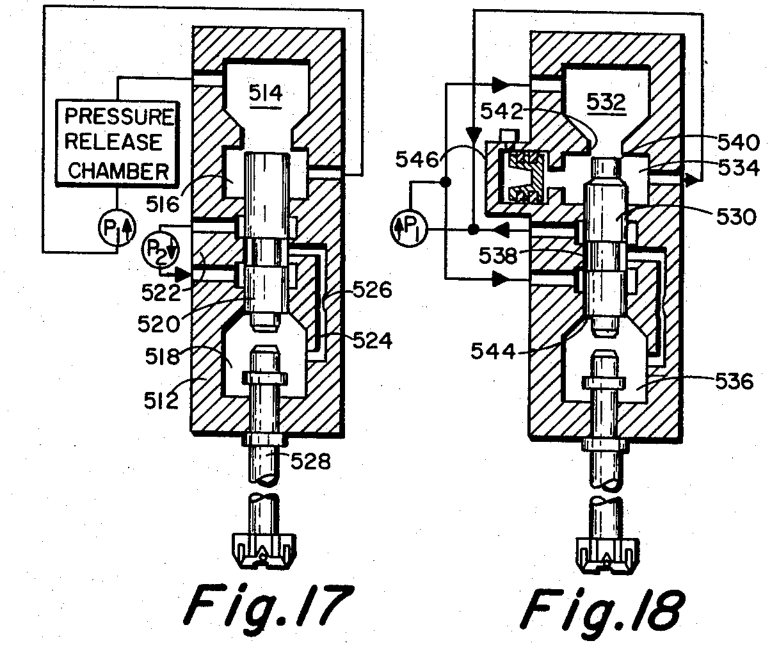

FIG. 17 shows an impact tool embodying the invention which is similar in design to the tool illustrated in FIGS. 1–10 in that it includes a housing 512 having plurality of cavities 514, 516 and 518. A hammer element 520 is disposed in a bore in the cavities. A centering circuit 522 controls the position of the hammer 520 and establishes its equilibrium position. In accordance with the feature of the embodiment of the invention shown in FIG. 17, the lower cavity 518 and the intermediate cavity of the centering circuit 522 are communicated with each other by a fluid passageway 524. A constriction 526 in this fluid passageway provides an acoustic resistance which, in combination with the stiffness of the fluid in the cavity 518 defines a time constant long (viz. 3 to 10 times) compared to the period of the oscillation frequency. Accordingly, the centering circuit is not responsive at the hammer oscillation frequency, but only to relatively slow changes in hammer position.

The tool includes pump $P_1$ and $P_2$; the pump $P_1$ providing fluid pressure for driving the hammer 520 and the pump $P_2$, providing flow through the centering circuit and into the lower cavity 518. An anvil system 528, similar to the system shown in FIG. 13 is provided.

FIG. 18 illustrates an impact tool which is structurally similar to the tool shown in FIG. 17. The tool in FIG. 18, however, has a different hammer element 530 and a different arrangement for feeding pressurized fluid to the cavities 532, 534, 536 and to the centering circuit 538.

The hammer 530 has a reduced diameter upper end 540. The rim of this upper end and the porting structure provided in the bore between the first and second cavities 532 and 534 provides a variable area orifice 542. The lower end 544 of the hammer presents an area to the lower cavity 536 approximately twice the area of the upper end 540.

The fluid feeding arrangement has the advantage of using a single pump $P_1$ which feeds fluid into the lower chamber of the centering circuit 538 and into the first cavity 532. A return to the pump is provided by fluid passages from the upper chamber of the centering circuit and from the second or discharge cavity 534. Since the average pressure in the third cavity 536 is half the supply pressure of the pump $P_1$ by virtue of the pressure divider action of the centering circuit, the upward force on the hammer element 530 is equal to the downward force on the element by virtue of the full supply pressure in the first cavity 532, the area of the top end 540 of the hammer being half the area of the bottom end 544 thereof.

An accumulator 546 is in fluid communication with the second cavity 534 to reduce the pressure variation in the cavity 534 by virtue of the pumping action of the shoulder formed between the reduced diameter end 540 of the hammer and the body thereof.

Referring to FIG. 19, there is shown an impact tool similar to the tool shown in FIG. 17, the tool having a housing 548, having cavities similar to those of the housing 512 (FIG. 17). The tool, however, has a hammer element 550 which extends through a bore portion 552 in the lower end 554 of the housing 548. A fluid seal 556 prevents escape of pressurized fluid from the lower cavity in the housing 548.

A casing 558 is attached by means of bolts 560 to the lower end 554 of the housing 548. This casing includes a bore into which the lower end 551 of the hammer 550 extends. The upper end 564 of an anvil system 556 extends into the bore in the casing 558 and is held therein properly spaced from the lower end 551 of the hammer 550 by means of a flange 568 which may move along the longitudinal axis of the casing 558 by virtue of being disposed in a cylindrical cavity 570 in the casing 558. The limitations of motion of the anvil system 566 is set between the upper and lower surfaces of the cavity 570 and the upper and lower surfaces of the flange 568.

Figure 20:
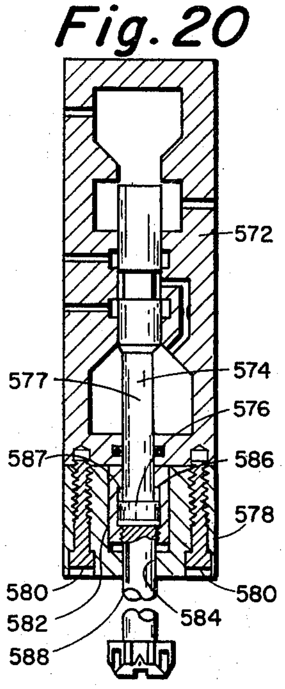

FIG. 20 illustrates an impact tool similar to the tool shown in FIG. 19, the tool in FIG. 20 including a housing 572 similar to the housing 548, and a hammer element 574. The hammer element 574 is, however, provided with a foot in the form of an enlarged boss 576 at the lower end 577 thereof.

Another housing or casing 578 is attached to the lower end of the housing 572 by bolts 580. The casing 580 has a large diameter bore portion 582 and a small diameter bore portion 584. A cup-shaped shoe 586 is slidably disposed in the large diameter bore portion 582. The upper end of an anvil system 588 extends through the small diameter bore portion 584 and is attached, as by threads, to the shoe 586. The lower end 577 of the hammer 574 extends through a bore 587 in the upper end of the shoe 586 which has a diameter smaller than the diameter of the boss 576. The shoe 586 is shorter than the bore portion 582.

In operation, when the housing 572 is lowered so that the bit at the lower end of the anvil 588 hits the formation, the shoe 586 will move upwardly until its motion is limited by the bottom of the housing 572, as shown. The clearances between the boss 576 and the upper end of the bore 587 in the shoe and between the boss 576 and the upper end of the anvil system 588 is such that the bottom of the boss 576 impacts the anvil system. The clearance between the top of the boss and the upper end of the bore 587 exceeds the upper limit of the motion of the boss 576. The anvil system is then driven in a downward direction. The system may be driven in an upward direction by moving the housing upwardly with respect to the anvil system 588. The bottom of the shoe 586 then is referenced against the bottom of the bore 582. The upper surface of the boss then impacts against the upper end of the bore 582. There is sufficient clearance between the upper end of the anvil and the lower end of the boss to prevent impact therebetween. If the anvil is stuck in a hole, upward impact will be applied to release the anvil from the hole.

Figure 21:
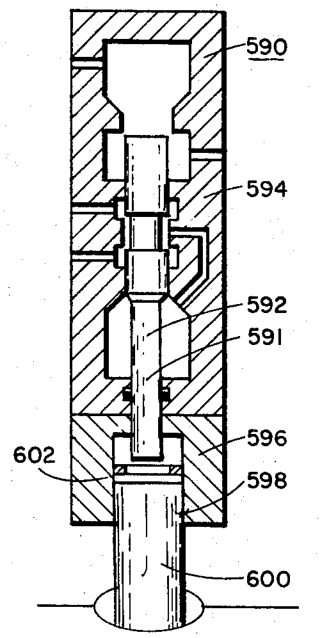

FIG. 21 illustrates an impact tool 590 similar to the tool shown in FIG. 19 in that the bottom end 591 of the hammer element 592 extends out of the lower end of the housing 594 of the tool 590. The tool is adapted for use as a pile driver by means of a casing 596 which may be attached to the lower end of the housing 594. The casing includes a bore 598 into which a pile 600 may be received. A flange 602 provides a stop for referencing the housing with respect to the hammer 592 such that the pile is impacted during the fraction of the cycle of oscillation of the hammer 592. By repetitive impacts the pile 600 may be driven into the ground.

FIG. 22 illustrates an impact tool which, similar to the tool shown in FIG. 21, is adapted for driving a pile 604. The tool includes a housing 606, having an upper cavity 608, a second cavity 610, and a main cavity 612. A hammer element 614 is disposed in the main cavity 612. The hammer element includes a piston 616 which divides the main cavity into upper and lower sections 618 and 620. A cylindrical rod 622 is disposed in a bore 624. The rod 622 is part of the hammer 614. A smaller diameter rod 626 extends from the top of the rod 622 through a small diameter bore into the cavity 610. The upper end of the rod 626 is disposed in line with the rim defined by the upper end 628 of the cavity 610 when the hammer 614 is in its equilibrium position. A rod 630, which is a somewhat smaller diameter than the rod 622 is a part of the hammer which extends through a fluid-sealed bore 632 in the lower end of the housing 686. The lower end of the rod 630 extends into a casing 634 similar to the casing 596 (FIG. 21) which includes a flange 636 which references the upper end of the pile with respect to the hammer element 616. The difference in area between the upper face and the lower face of the piston 616 (due to the difference in diameter of the rods 622 and 630) is equal to the area of the end of the rod 626. This difference in areas plays a part in controlling the equilibrium position of the hammer element 616 as will be explained more fully hereinafter.

A hydroacoustic oscillator amplifier 638 is in fluid-coupled relationship with the upper and lower sections 618 and 620 of the cavity 612 by means of fluid passages 640 and 642. The oscillator/amplifier 638 includes a housing 644, having a plurality of cavities therein which define, with a spool valve 646, a resonant oscillatory system. The spool valve and the porting structures between the cavities define valve orifices for metering the flow of fluid from a pump P into the amplifier cavity 648 of the housing and by way of a valve V into oscillator cavities 650 and 652. Discharge cavities 654 and 656, into which the fluid from the oscillator and amplifier cavities are metered by the spool valve, are coupled to the cavity sections 618 and 620. Accordingly, fluid having an alternating flow component at the resonant frequency of the hydroacoustic oscillator/amplifier 638 is introduced into the cavity 612. The mass of the hammer element 616 and the stiffness of the fluid in the sections 618 and 620 desirably has the same resonant frequency as the resonant frequency of the oscillator/amplifier 638. Accordingly the hammer 616 will be driven into oscillatory motion by virtue of the fluid in the cavity 612. A stub 647 is provided for adjusting the volume of one of the oscillator cavities 652 so that both the hydroacoustic oscillator/amplifier frequency and impact tool frequency are the same.

The equilibirum position of the hammer element is provided by a centering circuit including the cavities 608 and 610. Fluid from a pump 658 is fed into the cavity 608 through a fluid passage 660 which has a high acoustic resistance for isolating the pump from pressure variations at the frequency of motion of the hammer 616. The steady pressure in the cavity 608 is provided by the pump 658 such that the downward force at the upper end of the rod 606 balances the upward force on the rod due to the difference in areas of the upper and lower hammer rods 622 and 630, as explained above. If the hammer element moves, on average, from its equilibrium position, fluid is metered by the orifices 628 so as to either increase or decrease the pressure in the cavity 608, thereby to provide unbalanced forces on the hammer element which restore it to its equilibrium position.

Referring to FIG. 24, there is shown an impact tool 670 similar to the tool shown in FIG. 17 in that it includes a housing 672, having cavities 674, 676 and 678. A centering circuit 680 (shown diagrammatically in FIG. 24) is also included. A hammer element 682 is disposed in the housing and oscillates under the pressure of a fluid supplied thereto at the resonant frequency determined by the stiffness of the fluid in the first and third cavities 674 and 678 and the mass of the hammer 682 itself. An anvil system 684 is provided. This system may include a drill steel 686 and bit (the bit not being shown in FIG. 24). A hydraulic biasing system similar to that shown in FIG. 8 or FIG. 11 may be used to hold the drill steel 684 in position in the housing 670.

The anvil system includes a casing 688, into the lower end of which the drill steel 686 extends. A fluid seal (not shown) may be provided for preventing the drainage of fluid from a cavity 690 in the casing past the drill steel 686. This cavity may be cylindrical in shape and is sealed at the upper end thereof by a piston 692. The upper end 694 of the piston is opposed to and spaced from the lower end of the hammer 682 and is adapted to receive repetitive impulses from the hammer on each cycle of oscillation of the hammer. A liquid seal may be provided at the outer periphery of the piston to prevent the seepage of fluid from the cavity by way of any clearance which might exist between the outer periphery of the piston and the wall of the cavity.

The fluid 696 which is contained in the cavity 690 is desirably an hydraulic fluid, a silicone oil being preferred. The hydraulic fluid has a deflection characteristic akin to a non-linear spring. This characteristic may be configured as illustrated by the solid line curve of FIG. 24(*c*). Other shapes being obtainable as explained below. In other words, the movement of the drill steel 684 in response to an impact from the hammer 682 will follow the aforementioned curve. As pointed out above, this characteristic is similar to the deflection characteristic of the load presented by an earth formation. Accordingly, when the impact tool is coupled to a drilling bit and used to bore or drill a hole in an earth formation, the efficiency of transfer of impact forces to the formation is enhanced by virtue of the force transmission characteristics provided by the anvil system shown in FIG. 24. Different deflection characteristics may be obtained by changing the area of the piston exposed to the fluid in the cavity or the volume of the cavity. A smaller piston area, for a given force, increases the pressure on the fluid and enhances the nonlinearity. A larger volume, for such given force and for a given piston area decreases the stiffness presented to the hammer. For example, when drilling into earth formations, a fluid having an upwardly concave force-deflection characteristic is desired. Accordingly, a smaller piston area may be used.

From the foregoing description it will be apparent that there has been provided an improved acoustically-operated impact or vibratory percussion tool which has advantages of high operating speed and high efficiency of energy conversion. While the tool has been described in an earth boring environment, a tool embodying the invention may also be used in other applications, such as in a jack hammer, a vibratory press, a vibratory forging tool, a metal working tool, a metal boring tool and a machining tool, and for various materials fracturing or processing whenever mechanical impulse energy is desired. Accordingly the foregoing description should be taken merely as illustrative and not in any limiting sense.

What is claimed is:

1. A tool comprising:

(a) a housing, (b) a hammer element movably disposed in said housing, (c) means for circulating a fluid under pressure through said housing to produce self-excited oscillatory movement of said hammer element over a given displacement at a resonant frequency defined by the mass of said hammer element and the stiffness of the fluid in said housing, and (d) an anvil element movably disposed adjacent said housing, said element being spaced from said hammer element for receiving impacts therefrom.

2. A hydroacoustic impact tool for applying mechanical energy to a load comprising:

(a) a housing having a path for flow of fluid under pressure therethrough, (b) a hammer element in said path for controlling the flow of fluid through said housing and defining different fluid containing cavities in said housing, said cavities and said element defines an oscillating system having a resonant frequency at which said hammer is excited into oscillatory motion over a given displacement in response to the flow of said fluid, and (c) an anvil element movably supported by said housing spaced from said hammer element along the path of its said displacement for coupling the energy stored in said hammer during each cycle of oscillation thereof to said load.

3. An impact tool comprising:
(a) a housing having a plurality of cavities therein,
(b) a porting region separating a pair of said cavities,
(c) a hammer element movably disposed in said porting region and respectively exposed to different ones of said cavities,
(d) means for passing fluid under pressure into said cavities and through said porting region to produce self-excited oscillatory motion of said hammer element at the resonant frequency of the acoustic circuit defined by the mass of said hammer element and the stiffness of the fluid in said cavities to which the said element is exposed, and
(e) an anvil element attached to said housing spaced from said hammer and disposed to receive impacts from said hammer when said hammer executes its oscillatory motion.

4. An impact tool comprising:
(a) a housing having a plurality of cavities therein adapted to receive fluid under pressure,
(b) a porting region in said housing separating a pair of said cavities,
(c) a mechanism in said porting region for controlling the flow of fluid between said pair of cavities comprising a hammer element having faces respectively exposed to different ones of said plurality of cavities,
(d) means for passing fluid under pressure from one to the other of said pair of cavities to produce oscillatory motion of said hammer element about an equilibrium position at a resonant frequency determined by the mass of said hammer element and the stiffness of the fluid in said cavities to which said faces of said hammer element are exposed,
(e) an anvil element movably secured to said housing and disposed adjacent to said spaced from said hammer element when said hammer element is disposed in said equilibrium position, and
(f) means disposed in said housing adjacent to said hammer element and operated by the fluid flowing therein for establishing said equilibrium position of said hammer element.

5. An impact tool comprising:
(a) a housing having a plurality of cavities therein adapted to contain fluid and a plurality of bores respectively connecting adjacent ones of said cavities,
(b) a porting region in one of said bores,
(c) a valving mechanism disposed in said porting region for controlling the flow of fluid between the pair of said plurality of cavities connected by said one bore, said valving mechanism comprising a hammer element disposed in said bores and exposed on opposite faces thereof to the fluid in different ones of said cavities,
(d) means for passing fluid under pressure into said cavities and through said porting region to produce oscillatory motion of said hammer element about an equilibrium position at the resonant frequency of the acoustic circuit including the mass of said hammer element and the stiffness of the fluid in said ones of said cavities to which said opposite faces of said hammer are exposed,
(e) an anvil element movably secured to said housing and spaced from said hammer element when in its said equilibrium position,
(f) another porting structure in another of said bores, said other porting structure being in communication with one of said cavities to which one of said faces of said hammer element is exposed, and
(g) a valving mechanism provided by said hammer element for controlling the flow of fluid into said last named-one cavity in accordance with the position of said hammer element to locate said hammer element on the average in said equilibrium position.

6. The invention as set forth in claim 5, wherein said other porting region comprises a pair of chambers spaced from each other along said other bore and wherein said other valving mechanism comprises the rims defined by a chamber in said hammer element which bridges the spacing between said pair of chambers, and wherein said hammer element chamber is in communication with said last named one cavity.

7. An impact tool comprising:
(a) a housing having a plurality of cavities therein,
(b) a porting region between said cavities,
(c) a valving mechanism including a hammer element disposed in said cavities and in said porting region,
(d) an anvil element disposed in one of said cavities with an end thereof opposed to an end of said hammer element, and
(e) means for passing fluid under pressure through said cavities and porting region for producing self-excited oscillatory motion of said hammer element at the resonant frequency determined by the mass of said element and the stiffness of the fluid in at least those of said cavities in which the ends of said hammer element are exposed, said hammer element impacting said anvil element during each cycle of oscillation thereof.

8. An impact tool comprising:
(a) a housing having a plurality of cavities therein,
(b) said housing having a bore which communicates said cavities with each other,
(c) a porting structure in the portion of said bore between a first and a second of said cavities,
(d) a valving mechanism comprising a hammer element extending through said bore between said first and a third of said cavities and extending through said second cavity,
(e) fluid passageways for said housing for providing fluid under pressure in all said cavities and for circulating fluid under pressure between said first and second cavities through said porting structure to produce oscillatory motion of said hammer element at the resonant frequency determined by the stiffness of the fluid in said first and third cavities and the mass of said hammer element,
(f) an anvil element movably secured to said housing having an end opposed to an end of said hammer element and disposed out of contact therewith except upon impact therewith, and
(g) means responsive to the position of said hammer relative to said housing for changing the average pressure of the fluid in said third cavity for locating said opposed ends of said anvil and hammer elements with respect to each other.

9. The invention as set forth in claim 8, including a second housing connected to said first named housing, said second housing having a bore therein for receiving said anvil element, means for movably retaining said anvil element in said second housing, and an opening in said second housing in which opposed ends of said anvil and hammer elements face each other.

10. The invention as set forth in claim 8 including a second housing adjacent said first named housing, said second housing having an opening, a boot movably disposed in said opening and having an opening in the end thereof facing said first housing, an end of said hammer element extending through said boot opening, a foot on said hammer element end having dimensions larger than said boot opening, said anvil element being attached to and being movable therewith, and means for limiting the movement of said boot along the longitudinal axis of said hammer element so that said boot can selectively impact said boot in opposite directions.

11. The invention as set forth in claim 8 further comprising:

(a) a casing having a bottom opening for receiving a pile, said casing having top opening for receiving said hammer element, said casing including a stop for spacing opposing ends of said pile and hammer element from each other whereby to provide a pile driver.

12. An impact tool comprising:

(a) a housing having a plurality of cavities therein, (b) said housing having a bore which communicates said cavities with each other, (c) a porting structure in the portion of said bore between a first and a second of said cavities, (d) a valving mechanism comprising a hammer element extending through said bore between said first and a third of said cavities and extending through said second cavity, (e) means for establishing a certain average fluid pressure in said third cavity for producing a given average force on said hammer element in one direction, (f) means for passing fluid under pressure through said porting structure for establishing an average fluid pressure in said first cavity for producing an average force to counteract said given force on said hammer element in a direction opposite to said one direction, and to produce oscillatory motion of said hammer element about an equilibrium position at the resonant frequency determined by the stiffness of the fluid in said first and third cavities and the mass of said hammer element, (g) an anvil element movably secured to said housing having an end opposed to an end of said hammer element and spaced from the said equilibrium position of said hammer element, and (h) means responsive to the position of said hammer relative to said housing for changing the average pressure of the fluid in said third cavity for establishing forces in a direction to locate said hammer element in said equilibrium position.

13. The invention as set forth in claim 12 wherein said position responsive means comprises a hydraulic circuit in said means for establishing said fluid pressure in said third cavity, said hydraulic circuit including chamber (a) defined by a groove in said hammer element and by said bore; and a pair of chambers (b) and (c) on opposite sides of said chamber (a) defined by a pair of grooves in said bore and by said hammer element, and a fluid passage communicating said chamber (a) and said third cavity with each other.

14. An impact tool comprising:

(a) a generally cylindrical housing having an axial bore therethrough, said housing also having a plurality of cavities spaced from each other along the axis of said housing and communicating with each other by way of said bore, (b) a porting structure in said bore between a first and a second of said cavities which are adjacent to each other, (c) a hammer element extending through said bore from said first cavity to a third of said cavities which is adjacent to said second cavity, said hammer element occupying the portions of said bore through which it extends and providing a valving mechanism with said porting structure, (d) an anvil element movably disposed in the portion of said bore adjacent to said hammer element and having an end thereof in said third cavity and opposed to an end of said hammer element, (e) said anvil element also occupying said bore and extending into a fourth cavity, the area of said anvil element exposed from said bore in said fourth cavity being substantially equal to the area of said anvil element exposed from said bore in said third cavity;

(f) a fluid passage for introducing a fluid under pressure into said third cavity, (g) a fluid passage for communicating said third and fourth cavities with each other to produce an average fluid pressure therein about equal to said third cavity pressure, (h) fluid passages to said first and second passages for circulating fluid under pressure through said porting structure between said first and second cavities whereby to establish oscillatory motion of said hammer element at the resonant frequency determined by the stiffness of the fluid in said first and third cavities and the mass of said hammer element, and (i) means responsive to the position of said hammer relative to said housing for changing the average pressure of the fluid in said third cavity for controlling the average position of said hammer element.

15. An impact tool comprising:

(a) a housing having a plurality of cavities spaced successively along the length of said housing, said housing also having a bore which intersects said cavities, (b) a porting region in the portion of said bore between a first and a second of said cavities, (c) a hammer element movably disposed in the portion of said bore between said first cavity and a third of said cavities, which third cavity is located immediately beyond said second cavity, said hammer element providing a valve for controlling the flow of fluid through said porting region, (d) an anvil element movably secured to said housing and having an end opposed to said hammer element for receiving impacts therefrom, (e) fluid passageways for communicating fluid under pressure to said first and third cavities and discharging said fluid which passes through said porting region, from said second cavity, to produce oscillatory motion of said hammer element at the resonant frequency determined by the stiffness of said fluid in said first and third cavities and the mass of said hammer element, and (f) a pressure release device communicating with said second cavity to reduce acoustic pressure variation introduced in said second cavity by the motion of said hammer element.

16. The invention as set forth in claim 15 wherein said pressure release device comprises a housing having a chamber therein, a fluid passage way communicating said chamber and said second cavity, a piston separating said chamber into two sections in said chamber and movable in response to variations in pressure in said second cavity, the one of said sections which is separated from said second cavity by said piston containing a compressible medium.

17. An impact drilling tool comprising:

(a) a housing having a plurality of cavities therein spaced successively along the length of said housing, (b) a bore extending lengthwise along said housing and intersecting said cavities, (c) a porting structure in said bore between a first and a second of said cavities, (d) a hammer element disposed in said porting region to provide a valve and extending along those portions of said bore from said first cavity, through a second, and to third of said cavities, (e) an anvil element disposed in that portion of said bore between beyond said hammer element and passing through said housing, said anvil and hammer elements having opposed ends separated from each other except upon impact therebetween, (f) means for passing fluid under pressure into said third cavity and passing fluid from said first cavity to said second cavity through said porting region to produce oscillatory motion of said hammer element at the resonant frequency of the acoustic circuit including the mass of said hammer element and the stiffness of the fluid in said first and third cavities, (g) a hydraulic pressure feedback circuit in said bore connected to said third cavity and responsive to the position of said hammer element for providing an equilibrium position of said hammer element such that said opposed ends of said hammer and anvil elements are spaced from each other except during the portion of the cycle of motion of said hammer toward said anvil element, and (h) a drill bit coupled to the end of said anvil element opposite the end thereof which is opposed to said hammer element end.

18. The invention as set forth in claim 17, including a motor, and a drive coupling between said motor and said anvil element for rotating said anvil element while said anvil element is in motion.

19. The invention as set forth in claim 18 wherein said drive coupling includes a yieldable member coupled to said motor at one end thereof and at the opposite end thereof attached to said anvil element.

20. The invention as set forth in claim 17 further comprising:

(a) a column, (b) said housing being movably attached to said column, (c) a drive mechanism on said column attached to said drilling tool housing for translating said tool lengthwise along said column, and (d) a motor for operating said drive mechanism whereby said column, said tool which includes said housing, said drive mechanism and said motor provide a drilling rig.

21. An impact tool comprising:

(a) a housing having a plurality of cavities therein arranged in succession along the length of said housing, (b) said housing having a bore therein which extends lengthwise of said housing through said cavities and through one end of said housing, (c) a shaft rotatively disposed in said housing within said bore, (d) a porting structure in the portion of said bore between a first and a second of said cavities which immediately succeed each other, (e) a hammer element having a bore therethrough, said shaft extending through said hammer element bore and a third of said cavities and through said second cavity, said hammer element comprising a valve mechanism in said porting structure, (f) an anvil element disposed in the portion of said bore which extends through said one end of said housing, said anvil element having a bore therein in which said shaft is movably disposed for translation independent of said shaft and for rotation therewith, (g) fluid passageways in said housing for establishing fluid pressure in said third cavity and for passing fluid under pressure between said first and second passages through said valve mechanism for producing oscillatory motion of said hammer element at the resonant frequency determined by the mass of said hammer element and the stiffness of the fluid in said first and third cavities, and (h) a drive mechanism extending through said housing and coupled to said shaft for rotating said shaft.

22. The invention as set forth in claim 21 wherein said shaft has splines and said anvil element bore has grooves in which said splines are disposed for receiving torque from said shaft or said shaft rotates.

23. The invention as set forth in claim 21 wherein said plurality of cavities includes a fourth cavity disposed between said third cavity and said one end of said housing, said anvil element including a flange dividing said fourth cavity into first and second cavities successively more remote from said one end of said housing, a fluid passageway between said third cavity and said first section communicating pressurized fluid into said fourth cavity, a passageway through said housing to said second section for introducing a compressible medium therein, said flange and said passageways being configured to produce a fluid force for biasing said anvil element toward said hammer element.

24. An impact tool comprising:

(a) a housing having first, second and third cavities spaced from each other along the length of said housing, said housing having first, second and third bores in alignment with each other, said first bore being disposed between said first and second cavities, said second bore being disposed between said second and third cavities and said third bore having a smaller cross sectional area than said first and second bores and extending through one end of said housing, (b) a porting region in said first bore, (c) a hammer element occupying said second bore and extending to said porting region to provide a valve therein, (d) a rod extending from said hammer element and extending through said third bore, (e) a fluid seal between said rod and said third bore, (f) an anvil element disposed adjacent to said housing and having an end opposed to and spaced from the end of said rod extending through said third bore, and (g) fluid passages for passing pressurized fluid through said porting region and for establishing fluid pressure in said third cavity to produce oscillatory motion of said hammer at the resonant frequency determined by the mass of said hammer element and the stiffness of the fluid in said first and third cavities to impact said rod against said anvil on alternate half cycles of said motion.

25. An impact tool comprising:

(a) a housing having a first, a second and third cavity adjacent to each other therein, said second cavity being disposed between said first and third cavities, (b) said housing having a bore which extends therein through one end thereof, a first portion of said bore being located between said first and second cavities and a second portion of said bore being located between said second and third cavities, (c) a hammer element in said housing disposed along said bore, said hammer element providing a valving mechanism for controlling the flow of fluid through said first and second bore portions.

(d) first and second fluid passageways through said housing for the flow of pressurized fluid with respect to said first and third cavities, respectively, a third fluid passageway in said housing for the flow of pressurized fluid with respect to said second cavity, (e) an anvil element having an end opposed to and spaced from an end of said hammer element, the portions of one of said hammer element and anvil element adjacent said opposed hammer and anvil element ends extending through the portion of said bore which extends through said one end of said housing, and (f) means for passing pressurized fluid from said first and second passageways through said first cavity and said third cavity, through said first, through said second bore portion, and through said second cavity to said third fluid passageway to produce oscillatory motion of said hammer element at the resonant frequency determined by the mass of said hammer element and the stiffness of the fluid in said first and third cavities such that said opposed ends of said hammer and anvil elements impact each other during each cycle of said oscillatory motion.

26. The invention as set forth in claim 25 wherein said first and second fluid passageways have flow resistance sections therein, said hammer element and said first bore portion defining a first variable area orifice in said valve mechanism, said hammer element and said second bore portion defining a second variable area orifice in said valve mechanism, pump means for pressurizing and pumping said fluid having an inlet and an outlet, said pump means being included in said fluid passing means with one of said inlet and outlet coupled in parallel to said first and second fluid passageways and the other of said inlet and outlet coupled to said third fluid passageways, said resistance elements and said orifices being included in said fluid passing means to define a bridge circuit for controlling the average pressure in said first and third cavities whereby to control the position of said valve.

27. The invention as set forth in claim 26, including a porting structure disposed in the one of said first and second bores closest to said opposed ends of said hammer and anvil elements for reducing the area of the one of said orifices defined by said one of said first and second bores.

28. An impact tool comprising:
(a) a housing having first, second and third cavities therein, and second cavity being disposed between said first and third cavities,
(b) a bore having a first portion between said first and second cavities and a second portion between said second and third cavities,
(c) a hammer element having an upper end disposed adjacent to the lower rim of said first bore portion at the intersection of said first bore portion and said second cavity, the edge of said upper hammer end and said lower rim defining a variable area valve orifice, said hammer being disposed in and substantially occupying said second bore portion,
(d) an anvil element having an upper end opposed to and separated from said hammer element lower end,
(e) a first fluid passageway for communicating pressurized fluid to said third cavity,
(f) first pump means for supplying said fluid to said third cavity via said first fluid passageway,
(g) a valve in said passageway for regulating the pressure of said fluid in said third cavity,
(h) second and third fluid passageways for communicating with said first and second cavities respectively, and
(i) second pump means coupled between said second and third passageways for passing pressurized fluid through said valving orifice to produce oscillatory motion of said hammer element at the resonant frequency determined by the mass of said hammer element and the stiffness of the fluid in said cavities so that said hammer and anvil impact each other when said hammer approaches one extreme of its displacement.

29. A hydroacoustic device comprising:
(a) a housing having a path for the flow therethrough of a fluid under pressure including separate inlet and discharge passageways,
(b) said housing having a pair of cavities spaced from each other along said path,
(c) a four-way valve fluid flow control means interposed in said path for feeding said fluid into said cavities through their said inlet passageways and for discharging said fluid from said cavities through their said discharge passageway for producing pressure variations therein,
(d) said valve being exposed at opposite ends thereof to different ones of said pair of cavities for feeding back upon said valve said pressure variations in said cavities to support oscillatory motion of said valve, and
(e) a means for coupling oscillatory energy from one of said valve and said cavities.

30. Hydroacoustic apparatus comprising:
(a) a housing having first and second cavities therein, said housing also having a bore extending between said cavities,
(b) first, second, third and fourth porting structures in said bore,
(c) a unitary valve element in said bore having four valve mechanisms for controlling the flow of fluid respectively through said first, second, third and fourth porting structures,
(d) fluid passageways for feeding fluid under pressure into said first and second cavities respectively through a first and second of said porting structures,
(e) fluid passageways for discharging said fluid respectively from said first and second cavities through a third and a fourth of said porting structures,
(f) means for circulating said fluid having a supply port connected to said feeding fluid passageways and having a return port connected to said discharging fluid passageways to produce oscillatory motion of said valve element at the resonant frequency determined by the stiffness of said fluid in said first and second cavities and the mass of said valving element, and
(g) means operative in response to said oscillatory motion for transferring energy in said motion to a load.

31. A tool comprising:
(a) a housing having first and second cavities,
(b) said housing also having a bore which extends between said cavities,
(c) a valve mechanism in said bore including a hammer element having first, second and third peripheral grooves thereon, said grooves being spaced from each other along said element to define a first and second lands on opposite sides of said second groove,
(d) said bore having first and second porting structures adjacent to the opposite edges of said first land which defines first and second variable area orifices in said valve mechanism, said bore also having third and fourth porting structures adjacent to the opposite edges of said second land which define third and fourth variable area orifices in said porting structure,
(e) a first fluid passageway communicating said first cavity and said first and second orifices, a second fluid passageway communicating said second cavity and said third and fourth orifices,
(f) a third fluid passageway for communicating with said first and second fluid passageways respectively through said second and third orifices,
(g) a fourth fluid passageway communicating with said first fluid passageway through said first orifice,
(h) a fifth fluid passageway communicating with said second fluid passageway through said fourth orifice,
(i) pump means having for circulating a pressurized fluid through said housing between said third fluid passageway and said fourth and fifth fluid passageways for providing oscillatory motion of said hammer element at the resonant frequency determined by the stiffness of the fluid in said first and second cavities and the mass of said hammer element, and
(j) means for transferring the energy in said hammer element motion to a load.

32. The invention ts set forth in claim 31 wherein the distances measured along the longitudinal axis of said hammer element between said first orifice and the center of said fourth passageway and between said fourth orifice and the center of said fifth passageway are greater than the distances between said second orifice and the center of said third passageway and between said third orifice and the center of said third passageway.

33. An impact tool comprising:
(a) a housing having a first, second and a third cavity, one below another along the length of said housing,
(b) a bore extending through said housing and connecting said cavities with a first and second bore portions disposed between said first and second cavities and between said second and third cavities, respectively, (c) said housing having first and second chambers communicating with said second bore portion and spaced one below the other along the length of said housing, (d) a hammer element disposed in said bore, the upper end of said hammer element being located in said first bore portion, exposed to said first cavity and defining a valve mechanism for controlling the flow of fluid through said first bore portion, the bottom end of said hammer element being exposed to said third cavity, said hammer element having a peripheral opening which, with said second bore portion, defines a third chamber opposite ends of said third chamber being spaced from each other a distance approximately equally to the distance between adjacent ends of said first and second chambers and defining valve mechanisms therewith for controlling the flow of fluid between said third chamber and said first and second chambers, (e) a first fluid passageway having a constricted portion presenting a high acoustic resistance at the frequency of operation of said tool communicating said third cavity and said third chamber, (f) second and third fluid passageways communicating respectively with said first and second chambers, (g) fourth and fifth fluid passageways communicating respectively with said first and second cavities, (h) an anvil element having an end opposed to and spaced from said bottom end of said hammer element except during impacts therebetween, (i) first pump means for supplying fluid at a certain fluid pressure, having a supply connection to said third passageway and return connection to said second passageway, and (j) second pump means for supplying fluid at about half said certain pressure having a supply connection to said fourth passageway and a return connection to said fifth passageway, the flow of fluid between said fourth and fifth passageways through said first bore portion producing oscillatory motion of said hammer element at the resonant frequency of operation determined by the stiffness of the fluid in said first and third cavities and the mass of said hammer element, said hammer element impacting said anvil element during each cycle of oscillation to transfer the alternating energy stored in said hammer element during said each cycle to said anvil element.

34. An impact tool comprising:

(a) a housing having a first, a second and a third cavity, one below another along the length of said housing, (e) a bore extending through said housing and connecting said cavities with a first and a second bore portion disposed between said first and second cavities and between said second and third cavities, respectively, (c) said housing having first and second chambers communicating with said second bore portion and spaced one below the other along the length of said housing, (d) a hammer element disposed in said bore, the upper end of said hammer element being located in said first bore portion and being exposed to said first cavity, said hammer element also defining a valve mechanism for controlling the flow of fluid through said first bore portion, the bottom end of said hammer element being exposed to said third cavity and having an exposed area about twice the area of said upper end which is exposed to said first cavity, said hammer element having a peripheral opening, which with said second bore portion, defines a third chamber, opposite ends of said third chamber being spaced from each other a distance approximately equally to the distance between adjacent ends of said first and second chambers and defining valve mechanisms therewith for controlling the flow of fluid between said third chamber and said first and second chambers, (e) a first fluid passageway having a constricted portion presenting a high acoustical resistance at the frequency of operation of said tool communicating said third cavity and said third chamber, (f) second and third fluid passageways communicating respectively with said first and second chambers, (g) fourth and fifth fluid passageways communicating respectively with said first and second cavities, (h) an anvil element having an end opposed to and spaced from said bottom end of said hammer element, and (i) pump means for supplying fluid under pressure having a supply connection to said third and fourth passageways and a return connection to said second and fifth passageways, the flow of fluid between said fourth and fifth passageways through said first bore portion producing oscillatory motion of said hammer element at the resonant frequency of operation determined by the stiffness of the fluid in said first and third cavities and the mass of said hammer element, said hammer element impacting said anvil element during each cycle of oscillation to transfer the alternating mechanical energy stored in said hammer element during said each cycle to said anvil element.

35. An impact tool comprising:

(a) a housing having a cavity therein and a bore along the length of said housing, said bore including portions communicating with opposite ends of said cavity, (b) a hammer element disposed in said bore and extending through said cavity, said hammer element having a flange which separates said cavities into first and second sections, (c) fluid passageways through said housing, respectively communicating with said first and second sections, (d) a hydroacoustic transducer coupled to said fluid passageways for passing fluid in push-pull relationship through said passageways into said sections to produce oscillatory motion of said hammer element, (e) an anvil element secured to said housing in impact receiving relationship with said hammer element, (f) said hammer element in a first of said sections having smaller cross sectional area than said hammer element in a second of said sections whereby to produce a hydraulic force biasing said element in one direction, and (g) hydraulic means in said housing responsive to the position of said hammer element for applying a hydraulic force to counteract said bias whereby to provide a certain equilibrium position for said element in said bore.

References Cited

UNITED STATES PATENTS

| | | | |
|---|---|---|---|
| 1,195,478 | 8/1916 | Knapp | 175—56 |
| 1,857,624 | 5/1932 | Degenhardt et al. | 173—116 X |
| 1,942,690 | 1/1934 | Feucht | 91—232 |
| 2,742,265 | 4/1956 | Snyder | 175—56 |
| 2,893,692 | 7/1959 | Marx | 175—56 |
| 2,911,192 | 11/1959 | Boucher | 175—56 |
| 3,004,389 | 10/1961 | Muller | 175—56 X |
| 3,133,472 | 5/1964 | Zollinger | 173—135 X |
| 3,154,153 | 10/1964 | Wilder et al. | 173—135 X |
| 3,213,615 | 10/1965 | Bjornberg | 173—134 X |
| 3,262,507 | 7/1966 | Hansen | 175—56 |

HALL C. COE, *Primary Examiner.*